United States Patent [19]
Marcus et al.

[11] Patent Number: 5,757,486
[45] Date of Patent: May 26, 1998

[54] DIGITAL CAMERA IMAGE SENSOR POSITIONING APPARATUS INCLUDING A NON-COHERENT LIGHT INTERFEROMETER

[75] Inventors: Michael A. Marcus, Honeoye Falls; Timothy M. Trembley, Rochester; David S. Uerz, Ontario, all of N.Y.

[73] Assignee: Eastman Kodak Company, Rochester, N.Y.

[21] Appl. No.: 756,097

[22] Filed: Nov. 22, 1996

[51] Int. Cl.$^6$ .................................................. G01B 9/02
[52] U.S. Cl. ................................ 356/345; 356/357
[58] Field of Search .................. 356/345, 355, 356/357, 358; 348/345, 359

[56] References Cited

U.S. PATENT DOCUMENTS

| | | |
|---|---|---|
| 3,791,735 | 2/1974 | Nakazawa et al. . |
| 4,373,804 | 2/1983 | Pryor et al. . |
| 4,900,151 | 2/1990 | Ulbers . |
| 4,929,082 | 5/1990 | Webber . |
| 4,993,830 | 2/1991 | Jarrett . |
| 5,428,446 | 6/1995 | Ziegert et al. . |
| 5,446,545 | 8/1995 | Taylor . |
| 5,459,570 | 10/1995 | Swanson et al. . |
| 5,510,625 | 4/1996 | Pryor et al. . |

OTHER PUBLICATIONS

Technical Data Sheet, "The Intelligent QUALIFIER 2000" dated Jun. 1, 1990, pp. 1–3.
Technical Data Sheet, "The Intelligent QUALIFIER" dated Jan. 1, 1991, pp. 41–42.
Article entitled "Lenses" pp. 26–27, No date.
"New measurement system for fault location in optical waveguide devices based on an interferometric technique", Tankade et al, Applied Optics, May 1987, 1603–1606.

Primary Examiner—Samuel A. Turner
Attorney, Agent, or Firm—Susan L. Parulski

[57] ABSTRACT

An optical probe apparatus and method for determining a position of an image sensor within a digital camera relative to a reference surface. The apparatus includes an optical probe assembly removably mountable to the digital camera. A non-coherent light interferometer in communication with the optical probe assembly is utilized to determine a depth from a reference surface to the image sensor and optical probe assembly.

12 Claims, 14 Drawing Sheets

DIGITAL CAMERA IMAGE SENSOR POSITIONING APPARATUS INCLUDING A NON-COHERENT LIGHT INTERFEROMETER

CROSS-REFERENCE TO RELATED APPLICATIONS

This application is related to commonly assigned U.S. Ser. No. 08/408,871, titled ASSOCIATED INTERFEROMETRIC MEASUREMENT APPARATUS FOR DETERMINING A PHYSICAL PROPERTY OF AN OBJECT, by Marcus et al, filed on Mar. 22, 1995, and issued as U.S. Pat. No. 5,659,392 and to commonly assigned U.S. Ser. No. 08/408,770, titled ASSOCIATED INTERFEROMETRIC MEASUREMENT METHOD FOR DETERMINING A PHYSICAL PROPERTY OF AN OBJECT, by Marcus et al, filed on Mar. 22, 1995, and issued as U.S. Pat. No. 5,596,409, and to commonly assigned U.S. Ser. No. 08/755,072, titled METHOD FOR DETERMINING A POSITION OF AN IMAGE SENSOR IN A DIGITAL CAMERA, by Marcus et al, filed on Nov. 22, 1996.

FIELD OF THE INVENTION

The invention relates to an apparatus and method for determining a position of an image sensor in a digital camera, whereby the image sensor can be positioned to provide a focused image.

BACKGROUND OF THE INVENTION

In a typical digital camera, an image beam is directed through a lens and onto an imager or image sensor, for example a CCD (Charge Coupled Device), comprised of an array of sensing elements. The lens and the CCD need to be properly positioned relative to each other within the digital camera to provide a focused image. In order to properly position the CCD, the position of the CCD needs to be determined. Such a position can be determined relative to a reference surface or reference plane.

A Coordinate Measuring Machine (CMM) is an example of an apparatus employed to determine the position of an object relative to a reference plane. Typically, the object is retained in a suitable holder on an optical bench. In one method to determine the position of an object, three points on a reference plane approximately 120 degrees apart are measured to define the reference plane; the coordinates of the three points being tracked in the x, y and z locations. A point on the object is then measured relative to the reference plane, and the distance from the reference plane is calculated. Typical coordinate measurement machines include contact probes for contacting each of the points defining the reference plane and the object, such as those described in U.S. Pat. No. 5,428,446 (Ziegart et al.), U.S Pat. No. 5,446,545 (Taylor) and U.S. Pat. No. 4,929,082 (Webber). These references include interferometers which monitor the displacement of the machine axes. Non-contact methods include optical triangulation as described in U.S Pat. No. 4,373,804 (Pryor) and U.S. Pat. No. 5,510,625 (Pryor).

While such apparatus and methods may have achieved a certain level of success, the apparatus are not readily transportable and simple to use. Further, the method is time consuming and often dependent on the skill of the operator.

Accordingly, a need continues to exist for an apparatus and method for determining the position of an image sensor in a digital camera. The apparatus needs to be robust, transportable, simple to use, and readily mounted and dismounted to the digital camera. The method must be fast, provide objective results independent of the operator, and provide accurate consistent results.

SUMMARY OF THE INVENTION

An object of the invention is to provide an apparatus and method for determining a position of an image sensor in a digital camera.

Another object of the invention is to provide such an apparatus which is robust, transportable, simple to use, and readily mounted to the digital camera.

Yet another object of the invention is to provide such an apparatus and method for determining the degree of flatness of an image sensor.

A further object of the invention is to provide such an apparatus and method for determining the parallelism of a plane of an image sensor relative to a reference surface.

Still another object of the invention is to provide such a method which is fast, provides objective results independent of the operator, and provides accurate, consistent results.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for determining a position of an image sensor in a digital camera relative to a reference surface on the digital camera. The image sensor includes an imager plane and an optically transparent plate having a front surface and a back surface, with the plate being spaced from the imager plane. The apparatus includes an optical probe assembly which is removably mountable to the digital camera and lockable in a predetermined orientation relative to the digital camera. The optical probe assembly includes both an optical probe, and a pellicle securely mounted relative to the optical probe, such that the pellicle is disposed intermediate the reference surface and the imager plane. The pellicle is disposed at a first depth from the reference surface when the optical probe is in the locked orientation, and the optically transparent plate is disposed intermediate the imager plane and the pellicle. The apparatus further includes a non-coherent light interferometer and a non-coherent light source in communication with the optical probe by means of an optical coupler. In addition, means are provided for determining (i) a second depth from the reference surface to the optically transparent plate front surface, (ii) an optical thickness of the optically transparent plate, and (iii) a third depth from the optically transparent plate back surface to the imager plane.

According to another aspect of the apparatus of the invention, for positioning such an image sensor in a digital camera relative to an in-focus position, the apparatus further includes translation means for aligning the imager plane at the in-focus position.

According to yet a further aspect of the apparatus of the invention, there is provided an apparatus for determining a position of an image sensor mounted in a digital camera relative to a reference surface on the digital camera. Such an apparatus includes an optical probe assembly which is removably mountable to the digital camera and lockable in a predetermined orientation relative to the digital camera. The optical probe assembly includes a plurality of optical probes, and a pellicle securely mounted relative to each of the plurality of optical probes, whereby the pellicle is disposed intermediate the reference surface and the imager plane. As such, the pellicle is disposed at a first depth from the reference surface when the optical probes are in the locked orientation, and the optically transparent plate is disposed intermediate the imager plane and the pellicle. The apparatus further includes a non-coherent light interferometer and a non-coherent light source in communication with the optical probes by means of an optical coupler; an optical switching means; and means for determining, for each of the plurality of optical probes, (i) a second depth from the reference surface to the optically transparent plate front surface, (ii) an optical thickness of the optically transparent plate, and (iii) a third depth from the optically transparent plate back surface to the imager plane.

According to yet a further aspect of the invention, there is provide an apparatus for determining a position of an image sensor mounted in a digital camera relative to a reference surface on the digital camera wherein the apparatus includes an optical probe assembly removably mountable to the digital camera and lockable in a predetermined orientation relative to the digital camera. The optical probe assembly includes both an optical probe, and a pellicle securely mounted relative to the optical probe. The pellicle is disposed intermediate the reference surface and the imager plane, and disposed at a first depth from the reference surface when the optical probe is in the locked orientation. The optically transparent plate is disposed intermediate the imager plane and the pellicle. The apparatus further includes a non-coherent light interferometer and a non-coherent light source in communication with the optical probe by means of an optical coupler; translation means for moving the optical probe along an axis normal to the reference surface to provide a plurality of measurement locations; and means for determining, at each of the plurality of measurement locations, (i) a second depth from the reference surface to the optically transparent plate front surface, (ii) an optical thickness of the optically transparent plate, and (iii) a third depth from the optically transparent plate back surface to the imager plane.

According to yet another aspect of the invention, there is provide an apparatus for determining whether an image sensor mounted in a digital camera is parallel relative to a reference surface. A further aspect of the invention provides an apparatus for determining the degree of flatness of an image sensor mounted in a digital camera.

The present invention provides an apparatus and method for determining the position of an image sensor in a digital camera. The apparatus is robust, transportable, simple to use, and readily mounted to the digital camera. The method is fast, provides objective results independent of the operator, and provides accurate and consistent results.

BRIEF DESCRIPTION OF THE DRAWING

The foregoing and other objects, features, and advantages of the invention will be apparent from the following more particular description of the preferred embodiments of the invention, as illustrated in the accompanying drawings.

FIG. 4(a) shows a cross-sectional view of the optical probe assembly of FIG. 3 while

DETAILED DESCRIPTION OF THE INVENTION

Figure 1:
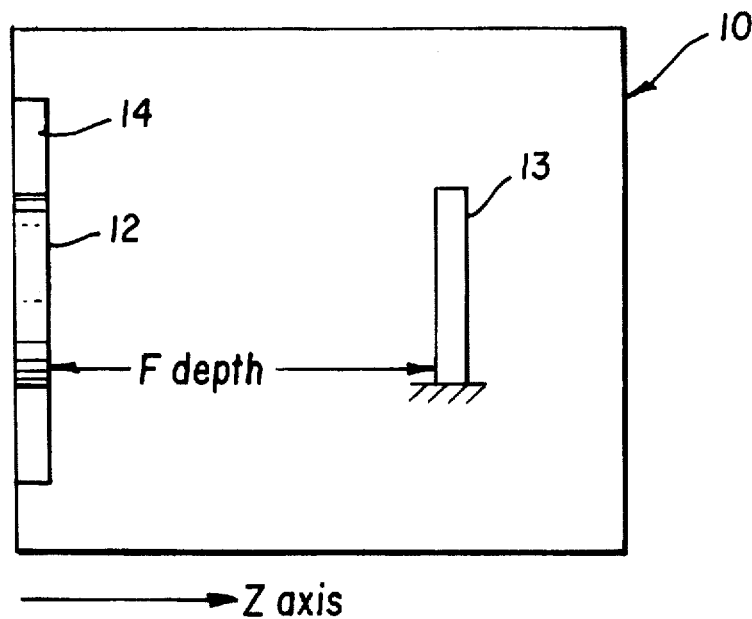
FIG. 1 shows a lens mounted within a camera body.

The following is a detailed description of the preferred embodiments of the invention, reference being made to the drawings in which the same reference numerals identify the same elements of structure in each of the several figures.

Referring to FIG. 1, a lens 12 is mounted to a camera body 10 by means of a lens mount 14. The distance at which lens 12 focuses light in the camera body is referred to as the focal depth $F_{depth}$ of the lens in air, measured along the z-axis. The focal depth $F_{depth}$ can be determined by means known to those skilled in the art. In a conventional camera employing photographic film 13 as the image media, the film is positioned at the focal depth $F_{depth}$ of the lens. FIG. 1 illustrates film 13 positioned at the focal depth of the lens, to provide a focused image. Means (not shown) such as film rails, may be employed to position film 13 at the focal depth $F_{depth}$. Hereinafter, the terminology "in-focus position" refers to a position at which an imaging media is positioned to provide an in-focus image.

Figure 2:
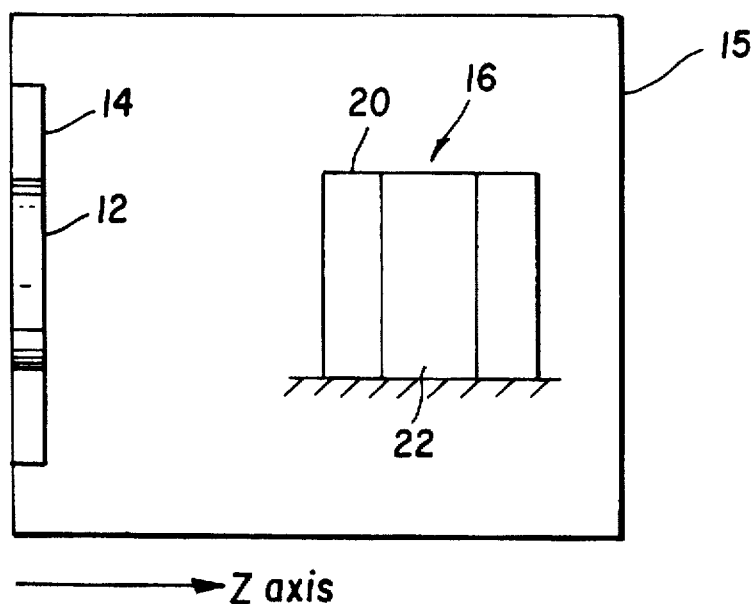
FIG. 2 shows a CCD mounted within a camera body.

Referring to FIG. 2, in a digital camera body 15, lens 12 is typically mounted to the digital camera by means of lens mount 14. An image sensor 16 is employed as the imaging media. Image sensor 16 comprises an imager plane 18 referring to an active surface of the image sensor. Image sensor 16 generally further comprises an optically transparent plate 20 having an index of refraction n. Imager plane 18 is spaced from plate 20 such that a gap or interstice 22 is interposed intermediate the imager plane and the plate. Typically, the imager plane and the transparent plate are hermetically sealed with a defined interstice 22.

As indicated above with regard to a conventional camera, the distance at which lens 12 focuses light is referred to as the focal depth $F_{depth}$ of the lens. However, in a digital camera, the presence of plate 20 (disposed intermediate the lens and the image sensor) affects the in-focus position. Accordingly, an in-focus position $F_1$ for imager plane 18, taking into account the presence of plate 20, is determined by:

$$F_1 = F_{depth} + \text{Delta} \quad \text{(Equation 1)}$$

wherein $$\text{Delta} = t\left(1 - \frac{1}{n}\right) \quad \text{(Equation 2)}$$

t being the thickness of plate 20 and n being the index of refraction of plate 20.

Figure 3:
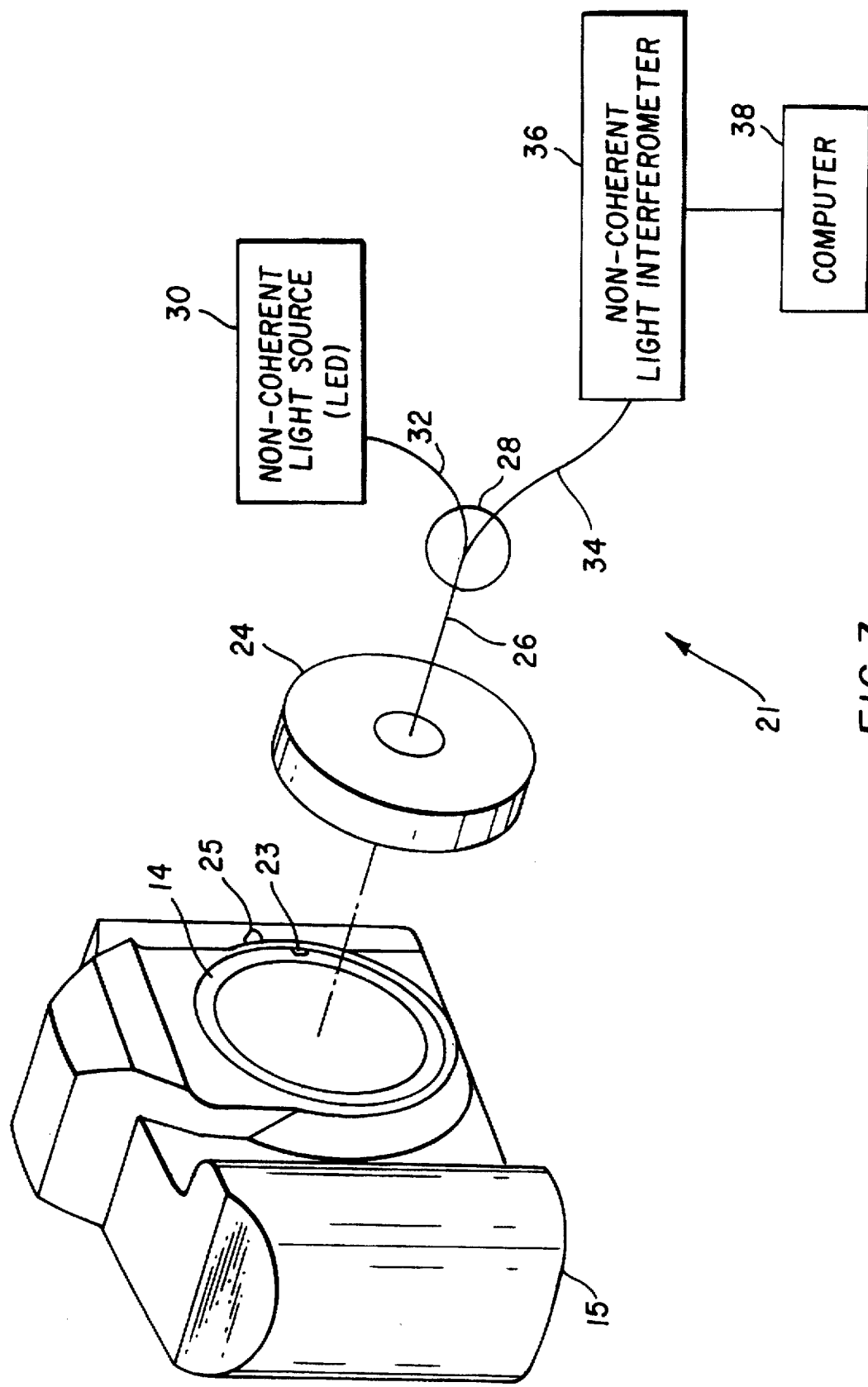
FIG. 3 shows a non-coherent light interferometric measurement apparatus according to the present invention.

FIG. 3 provides a general illustration of a non-coherent light interferometric measurement apparatus 21 according to the present invention for determining the position of image sensor 16 relative to a reference surface on the digital camera. The apparatus allows a user to verify that the position of imager plane 18 is within a desired tolerance. If the position of imager plane 18 is outside the desired tolerance, the image sensor can be re-positioned to move imager plane 18 to a desired position, such as the in-focus position $F_1$.

Lens 12 is generally mounted to digital camera body 15 by lens mount 14. Conventional means (not shown) are known to facilitate mounting of the lens to the camera body. Such means may include: a screw lens mount wherein screw threads allows installation of the lens to the camera body; a bayonet lens mount wherein the lens slips over a mating flange on the camera body with a twist of about 45 degrees; or a breechlock lens mount wherein a knurled collar on the back of the lens fits over a mating flange on the camera body. To secure the mounting, the lens mount may include a locking means to lock the lens to the lens mount. Similarly, to unlock the lens from the lens mount, an unlocking means may be included.

In the present invention, to determine the position of imager plane 18, lens 12 is removed from digital camera body 15. Since lens 12 is removed, the position of imager plane 18 is determined relative to a reference surface on digital camera body 15. While various surfaces (including, but not limited to, components of the digital camera body) may be used as a reference surface, for ease of discussion, lens mount 14 will provide the reference surface. Therefore, the position of imager plane 18 will be discussed as being determined relative to lens mount 14.

Referring to FIG. 3, an optical probe assembly 24 is removably mounted to lens mount 14 to securely, but temporarily, attach optical probe assembly 24 to digital camera body 15. Preferably, optical probe assembly 24 incorporates the means to allow the assembly to be mounted to digital camera body 15 by means of the bayonet lens mount wherein the assembly would slip over a mating flange on the camera body with a twist of about 45 degrees. To temporarily secure the mounting, a locking means 23, for example a spring loaded locking pin, locks optical probe assembly 24 to lens mount 14. To unlock optical probe assembly 24 from lens mount 14, an unlocking means 25 such as a spring loaded release pin, is employed thereby allowing optical probe assembly 24 to be readily released from digital camera body 15. Note that such locking means 23 and unlocking means 25 may optionally be employed to lock and unlock, respectively, lens 12 to lens mount 14.

Optical probe assembly 24 includes a single mode optical fiber cable 26 coupled to a 1×2 optical coupler 28. Preferably, connectors and patchcords (not shown) of vari-able length (preferably patchcords which terminate with a low back reflection connector such an FC connector) are disposed between optical coupler 28 and optical probe assembly 24 to permit portability for the apparatus and to permit remote location mounting. A non-coherent light source 30, such as an LED (Light Emitting Diode), is coupled into a single mode fiber 32 and passes through 1×2 optical coupler 28. A suitable non-coherent light source 30 is a high 267 bandwidth (approximately 40–120 nm) 1300 nm center wavelength LED having 1–10 microwatts of coupled power.

Generally, light from non-coherent light source 30 travels along optical fiber 26, transmitted through optical probe assembly 24, and is incident on image sensor 16. The light is reflected from each of the surface of image sensor 16, and passes back through optical probe assembly 24 into optical fiber 26. The reflected light then passes through 1×2 optical coupler 28 into an optical fiber 34, which is introduced into a non-coherent light interferometer 36. Preferably, interferometer 36 is of a Michelson configuration, though a non-Michelson configuration has been found suitable. Associated with non-coherent light interferometer 36 is a computing means 38, such as a computer, for controlling, collecting, manipulating, analyzing, and storing data.

Figure 4A:
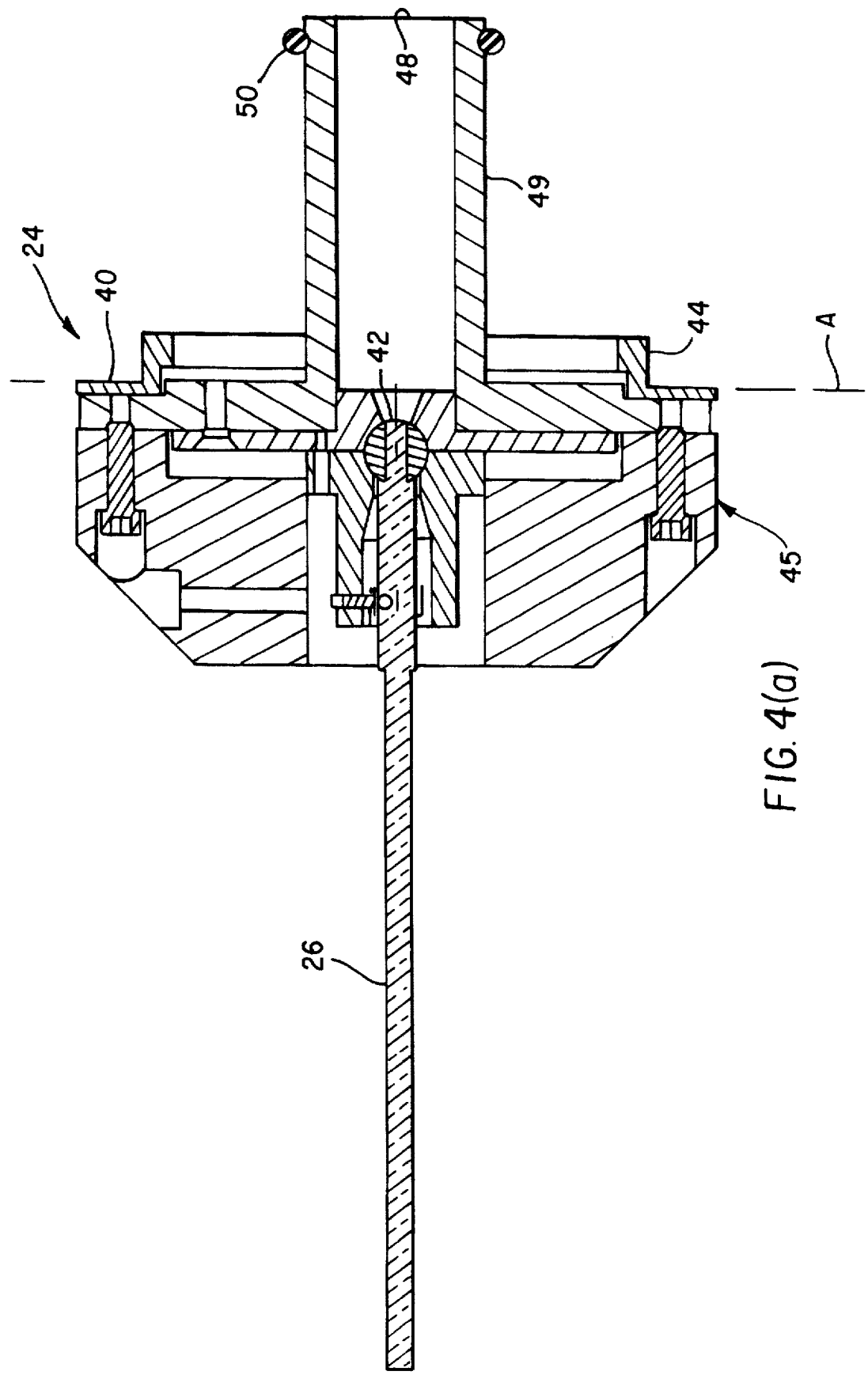
Figure 4B:
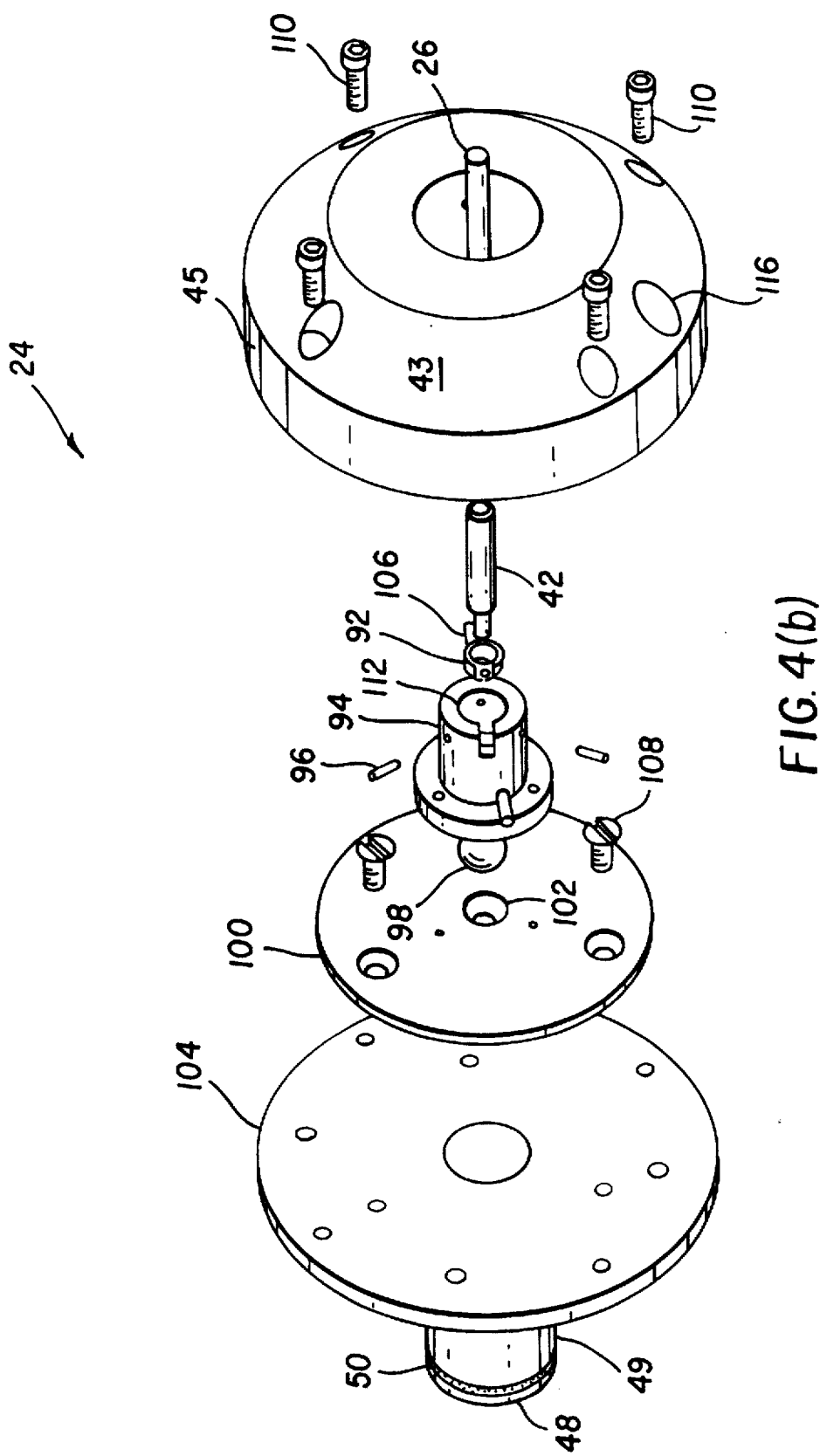
FIG. 4(b) shows an exploded view of the optical probe assembly of FIG. 3.

Optical probe assembly 24 is further illustrated in FIGS. 4(a) and 4(b). Optical probe assembly 24 comprises a probe mounting surface 40, an optical probe 42 such as a collimating lens or fiber collimator, probe assembly mounting means 44, probe housing 43 having a probe assembly gripping means 45, a probe recess 46 (not shown), a pellicle 48 disposed at a predetermined depth $P_{depth}$ from probe mounting surface 40, and a pellicle mount 49.

Probe assembly mounting means 44 allows optical probe assembly 24 to mate with a camera body wherein optical probe assembly 24 is removably mounted to camera body 15 in a predetermined orientation. As noted above, probe assembly mounting means 44 preferably incorporates the conventional bayonet lens mount wherein optical probe assembly 24 would slip over a mating flange on the camera body with a twist of about 45 degrees. As such, an operator would grasp optical probe assembly 24 by gripping means 45, and mount the optical probe assembly 24 to camera body 15 by positioning optical probe assembly 24 such that probe mounting surface 40 abuts lens mount 14. Optical probe assembly 24 would then be rotated (for example, by approximately 45 degrees) to dispose locking means 23 into recess 46, thereby locking optical probe assembly 24 to lens mount 14 in a predetermined orientation. In a preferred predetermined orientation, probe mounting surface 40 abuts lens mount 14 (i.e., the reference surface) to provide a predetermined depth of pellicle 48 from lens mount 14. The plane defined by abutting probe mounting surface 40 and lens mount 14 will hereinafter be referred to as Reference Plane A.

To release optical probe assembly 24 from camera body 15, an operator would grasp optical probe assembly 24 by gripping means 45, and depress unlocking means 25 to release locking means 23 from probe recess 46. If the conventional bayonet lens mount is utilized (wherein optical probe assembly 24 mounts to the camera body with a twist of about 45 degrees), optical probe assembly 24 can be rotated in an opposite direction (of approximately 45 degrees) to dismount the assembly from the camera body.

Pellicle 48 is comprised of an optically transparent material which is sufficiently thin so as to not affect the focal depth measurement. A suitable pellicle can be made of a polyester film material of approximately 1.5 μm. Means are provided for securely mounting the pellicle to optical probe assembly 24. For example, as illustrated, an O-ring 50 held in an O-ring groove provides secure mounting to pellicle mount 49. Other means may be known, such as setting pellicle 48 in place with a suitable adhesive. Pellicle mount 49 predeterminedly disposes pellicle 48 from probe mounting surface 40. A suitable pellicle mount 49 includes an open aperture of approximately 0.5 inches in diameter and an outer diameter of approximately 0.75 inches.

As indicated above, optical probe assembly 24 provides parallel collimated light to image sensor 16 when mounted in camera body 15, and collect light reflected back from image sensor 16. Accordingly, referring now to FIG. 4(b), optical probe assembly 24 includes fiber collimator 42, an optional fiber collimator collar 92, an adjustment collar 94, at least one adjustment means 96 (for example, a screw), a ball pivot 98, a ball pivot receiving plate 100 having an opening 102 to receive ball pivot 98, a mounting plate 104, an optional fiber collimator collar mounting means 106, at least one ball pivot receiving plate mounting means 108 (for example, a screw), and at least one optical probe assembly means 110. In the preferred embodiment, fiber collimator 42 is an active optical element including a single mode fiber pigtailed, quarter-pitch Gradient index (GRIN) lens assembly. A suitable fiber collimator 42 is a Dicon Fiber collimator Part Number FC-9-1.3 FC-3.0-L. Such a fiber collimator includes a lens having a beam diameter of about 0.45 mm and a beam divergence of less than 0.25 degrees.

If optional fiber collimator collar 92 is employed, it surrounds fiber collimator 42 and is securely mounted by optional fiber collimator mounting means 106. Such a suitable mounting means 106 is a 2-56 screw. Fiber collimator 42, with collar 92 securely mounted, is inserted into a recess 112 in adjustment collar 94. As represented in FIG. 4(b), the left-most end of fiber collimator 42 is inserted into rotatable ball pivot 98. Ball pivot 98, together with fiber collimator 42 attached, is inserted into opening 102 of ball pivot receiving plate 100. Adjustment collar 94 is then mounted to ball pivot receiver plate 100 using collar mounting screws (not shown). Adjustment means 96 allow adjustment of adjustment collar 94 to provide orientation adjustment capability of fiber collimator 42. Suitable adjustment means 96 is a 0-80 screw. These adjustment means 96 preferably contact a flat surface oriented approximately 120 degrees apart on fiber collimator collar 92. If optional fiber collimator is not employed, adjustment means 96 contact the outer surface of fiber collimator 42.

Ball pivot receiver plate 100 is fastened and centered with respect to mounting plate 104 by mounting means 108, thereby locking ball pivot 98 in position yet allowing free rotation of fiber collimator 42's optical axis by means of adjustment means 96. When assembly is complete, orientation of fiber collimator 42 is preferably performed by means of three 120 degree oriented adjustment screws 96. Adjustment is performed with optical probe assembly 24 mounted in the camera body. Adjustments are made until the non-coherent light interference signal from non-coherent light interferometer 36 is optimized. This occurs when the optical axis of fiber collimator 42 is normal to the reference surface of the camera body.

Adjustment means 96 are intentionally not readily accessible once gripping means 45 is attached to the assembly so that further adjustments can not be readily made to fiber collimator 42 during a measurement cycle. Rather, gripping means 45 is attached to optical probe assembly 24 by optical probe assembly means 110. In a preferred embodiment, three access holes (one illustrated as element 116 in FIG. 4(b)) in probe housing 43 are provided to permit fine-tuning adjustments to fiber collimator 42 via screws 96, if needed. During typical usage, fiber collimator 42 is positioned approximately at the plane of probe mounting surface 40 (i.e., the reference surface). During assembly, fiber collimator 42 is adjusted such that maximum signals from pellicle 48 are provided when connected to the non-coherent light interferometer. In a preferred embodiment, when mounted in camera body 15, pellicle 48 is mounted approximately 40 mm from lens mount 14 with a tight tolerance (of about +/−2 5 microns). Hereinafter, for ease of discussion, a collimating lens orientation and locking means 114 will comprise fiber collimator collar 92 (optional), adjustment collar 94, adjustment means 96, ball pivot 98, ball pivot receiving plate 100, opening 102, fiber collimator collar mounting means 106 (optional), collar mounting screws (not shown), and recess 112.

Figure 5:
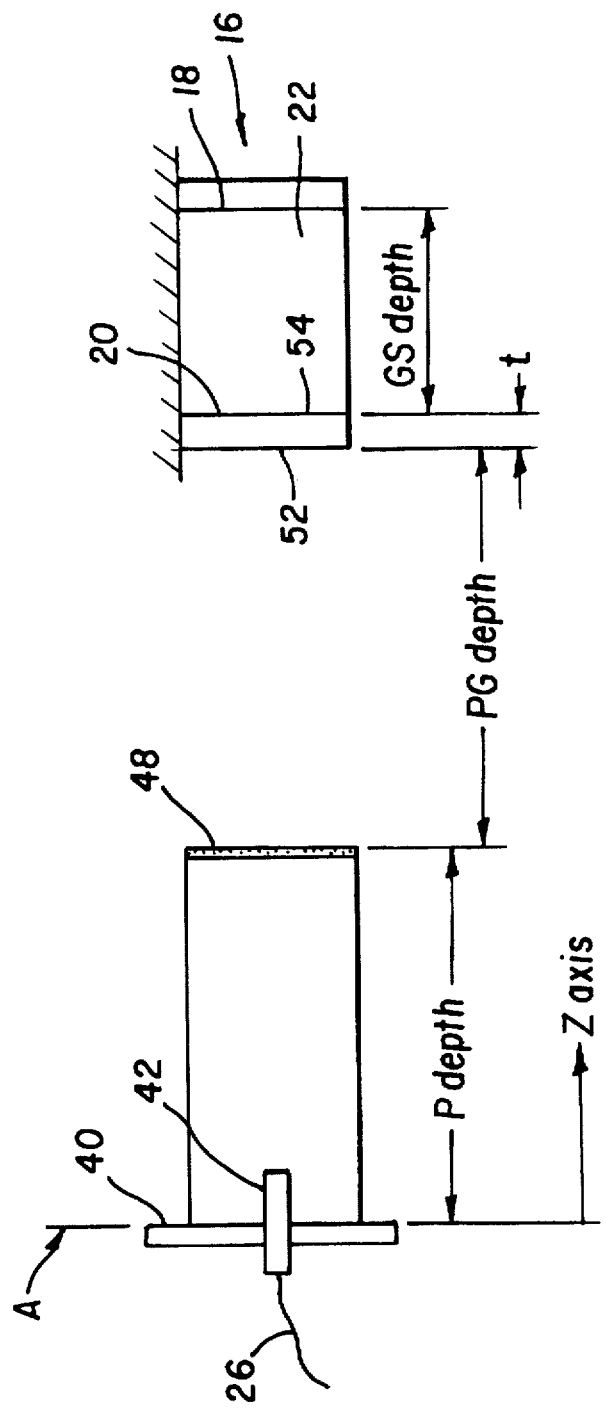
FIG. 5 shows a schematic view of the relationship of the optical probe assembly and the CCD when the optical probe assembly is mounted to the camera body.

With optical probe assembly 24 mounted to digital camera body 15, the orientation of optical probe 42 and image sensor 16 are as illustrated in FIG. 5. Pellicle 48 is disposed at a predetermined depth $P_{depth}$ from probe mounting surface 40 and, accordingly, lens mount 14 (i.e., the reference surface positioned at Reference Plane A). The depth from pellicle 48 to a front surface 52 of transparent plate 20 is referred to as $PG_{depth}$, while the depth from pelicle 48 to a back surface 54 of transparent plate 20 to imager plane 18 is referred to as $GS_{depth}$. Accordingly, the actual depth of $D_{actual}$ imager plane 18 relative to the reference surface (i.e., lens mount 14 at Reference Plane A) is:

$$D_{actual} = P_{depth} + PG_{depth} + t + GS_{depth} \qquad \text{(Equation 3)}$$

where $P_{depth}$ is the predetermined depth from Reference Plane A to pellicle 48; $PG_{depth}$ is the depth from pellicle 48 to front surface 52; $GS_{depth}$, is the depth from back surface 54 to imager plane 18; and t is the thickness of transparent plate 20;

The corresponding total optical depth $D_{optical}$ from pellicle 48 relative to the reference surface (i.e., lens mount 14 at Reference Plane A) is given by the equation:

$$D_{optical} = P_{depth} + PG_{depth} + nt + GS_{depth} \qquad \text{(Equation 4)}$$

where n is the index of refraction of plate 20.
Substituting Equation 3 into Equation 4 results in:

$$D_{actual} = D_{optical} - nt + t = D_{optical} - t(n-1) \qquad \text{(Equation 5)}$$

Accordingly, the difference between where imager plane 18 is actually positioned (i.e., $D_{actual}$) and the desired position, for example the in-focus position $F_f$, is referred to as the difference in focus $D_F$:

$$D_F = F_f - D_{actual} \qquad \text{(Equation 6)}$$

With the optical probe assembly locked to the digital camera in a predetermined orientation whereby the pellicle is disposed at a known reference depth relative to the reference surface, non-coherent light interferometry can be utilized to determine (i) the depth from the reference surface to the front surface of the optically transparent plate, (ii) the optical thickness of the optically transparent plate, and (iii) the depth from the back surface of the optically transparent plate to the image sensor. From this information, the position of imager plane 18 relative to the reference surface can be determined.

The depth $D_{RF}$ from the reference surface to front surface 52 of plate 20 is determined from the relationship:

$$D_{RF}=P_{depth}+PG_{depth} \qquad \text{(Equation 7)}$$

The value $P_{depth}$ is a predetermined value, and the value of $PG_{depth}$ is measured using the apparatus of the present invention.

Figure 6:
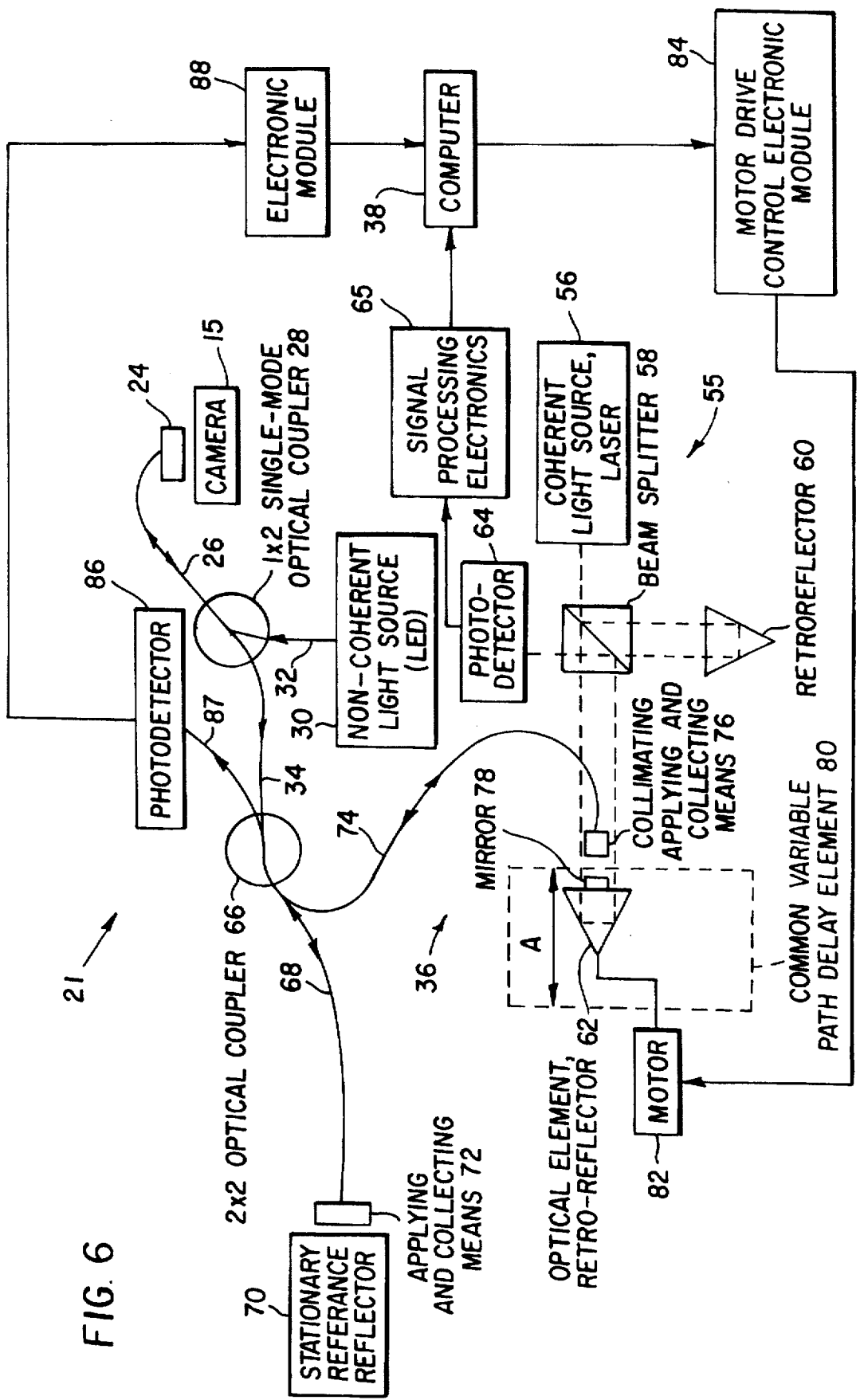
FIG. 6 shows a first embodiment of a non-coherent light interferometric measurement apparatus in accordance with the present invention.

FIG. 6 illustrates non-coherent light interferometric measurement apparatus 21 having an optional coherent light interferometer 55 in mechanical association with non-coherent light interferometer 36 in an autocorrelation mode configuration. The autocorrelation mode configuration allows the interference spectrum from image sensor 16 to be independent of the length of fiber disposed between imager sensor 16 and non-coherent interferometer 36. Applicants note that single mode optical fibers up to 10 km in length have been successfully utilized between optical probe assembly 24 and non-coherent light interferometer 36 without adverse affect to the resolution of the measurements.

As illustrated in FIG. 6, non-coherent light interferometric measurement apparatus 21 includes non-coherent light interferometer 36, optional coherent light interferometer 55, optical probe assembly 24, computer 38, and various electronics for signal processing and motor control.

While non-coherent light interferometer 36 can be of a standard mode configuration (described below), preferably, non-coherent light interferometer 36 is of an autocorrelation mode as illustrated in FIG. 6. The autocorrelation mode of non-coherent light interferometer 36 transforms a series of non-coherent light constructive interference peaks occurring at optical interfaces in the digital camera body to distances from a central autocorrelation peak.

Still referring to FIG. 6, coherent light interferometer 55 provides a known displacement profile as a function of time. Coherent light interferometer 55 includes a coherent light source 56, preferably a HeNe laser, emitting a collimated coherent light signal which is split by a splitting means 58, such as a beam splitter 58, into first and second coherent light signals of approximately equal intensity. The first coherent light signal is incident on a stationarily mounted retroreflector 60, while the second coherent light signal is incident onto a movable optical element, such as a retroreflector 62. The first and second coherent light signals are retro-reflected back to beam splitter 58 where they recombine and interfere with each other. This recombined, coherent light interference signal is detected by a photodetector 64 which is fed into and processed by signal processing electronics 65 and sent to computer 38. The coherent light signal is periodic, with a constant amplitude and provides constant distance interval data acquisition sampling capability. Accordingly, coherent light interferometer 55 monitors the motion of retroreflector 62; the position of retroreflector 62 being controlled by a common variable path delay element 80.

Non-coherent light source 30 emits a non-coherent light signal along single mode fiber 32 which passes through 1×2 optical coupler 28 to optical probe assembly 24. Within the optical probe assembly, a portion of the light signal is transmitted through the pellicle and applied to image sensor 16 positioned within camera body 15. A portion of the light signal is reflected by the pellicle, the front surface 52 of plate 20, the back surface 54 of plate 20, and imager plane 18. The light from non-coherent light source 30, which is reflected from image sensor 16 and pellicle 48, is collected by optical probe assembly 24 and passes through optical coupler 28 into optical fiber 34 to be introduced into non-coherent light interferometer 36.

The signal passing through optical fiber 34 (herein called the object signal) is split into first and second non-coherent light signals at 2×2 optical coupler 66. The first non-coherent light signal is directed along a single mode optical fiber 68 to a stationary reference reflector 70 through a collimating applying and collecting means 72. Alternatively, single mode optical fiber 68 can be terminated with a normal cleaved mirrored surface at its tip (not shown) in place of collimating applying and collecting means 72 and stationary reference reflector 70. A portion of the first non-coherent light signal is reflected back from stationary reference reflector 70 into collimating applying and collecting means 72, and is coupled back into single mode optical fiber 68. This signal is referred to as the reference signal. The second non-coherent light signal, traveling along single mode optical fiber 74, is incident on collimating applying and collecting means 76, which collimates the second non-coherent light signal. Collimating applying and collecting means 76 applies the second non-coherent light signal to a mirror 78 mounted onto retroreflector 62, of a common variable optical path delay element 80. Common variable optical path delay element 80 is mounted for precision movement by a motor 82 in a direction shown by arrow A. A portion of the second non-coherent light signal is reflected back from mirror 78 into collimating applying and collecting means 76 and is coupled back into single mode optical fiber 74, forming a delay signal. The optical path from 2×2 optical coupler 66 to stationary reference reflector 70 and back to 2×2 optical coupler 66 is defined as the optical path length of the stationary reference branch of non-coherent light interferometer 36.

While alternative configurations for variable optical path delay element 80 may be known to those skilled in the art, preferably, variable optical path delay element 80 includes a prism retroreflector and a mirror mounted on the diaphragm cone of a moving-coil loudspeaker; the mirror being mounted on a portion of the surface of the prism retroreflector. Therefore, as the loudspeaker cone moves to the left (as illustrated in FIG. 6), the optical path lengths of non-coherent light source 30 and coherent light source 56 increases by the same amount. Conversely, the optical path lengths of non-coherent light source 26 and coherent light source 56 decreases by the same amount as the loudspeaker cone moves to the right (as illustrated in FIG. 6). The optical path length of common variable optical path delay element 80 is preferably varied using a motor drive control electronic module 84 comprising a function generator and power amplifier, thereby controlling the current to the loudspeaker coil. Optical path delay element 80 may be displaced with a predetermined periodic velocity profile (such as a sine wave, saw tooth, or arbitrary waveform though the distance over which optical path delay element 80 must be sufficient to determine the position of imager plane 18.

In operation, the first and second non-coherent light signals traveling along single mode optical fibers 68 and 74, respectively, are reflected back to 2×2 optical coupler 66 (as the reference signal and the delay signal, respectively) where they recombine and interfere with each other to form a non-coherent light interference signal. A portion of the recombined reference signal and delay signal is directed into a photodetector 86 by a single mode optical fiber 87. The analog output of photodetector 86 is amplified and filtered by an electronic module 88, and then sampled, digitized, and analyzed by computer 38.

Note that a first and second branch of non-coherent light interferometer 36 is defined as the respective path lengths between the location at which 2×2 optical coupler 66 splits the light signal into two beams and the location at which the two beams are recombined and made to interfere with each other. In FIG. 6, the first branch is referred to as the stationary branch while the second branch is referred to as the movable branch.

Figure 7:
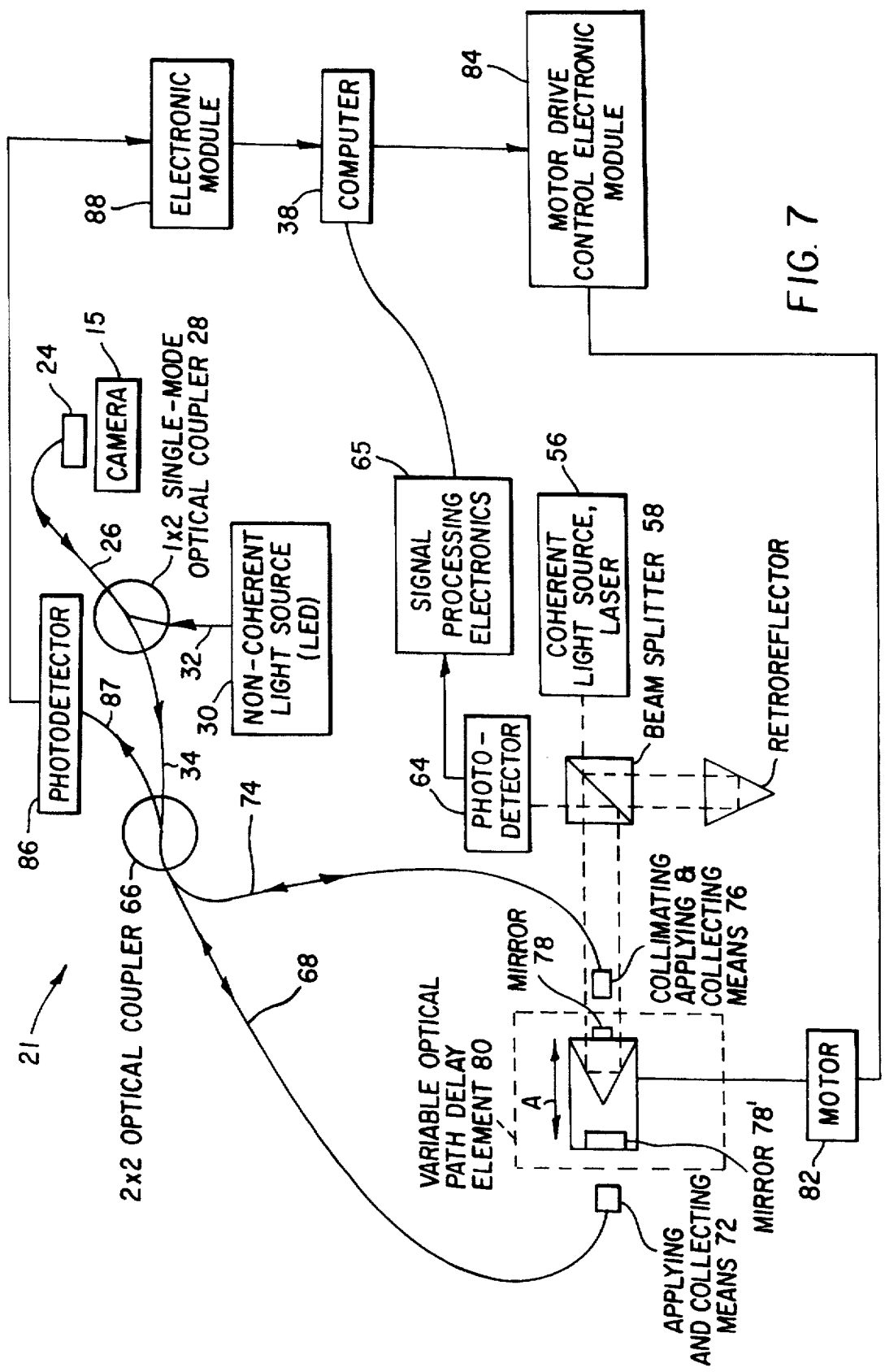
FIG. 7 shows a second embodiment of a non-coherent light interferometric measurement apparatus in accordance with the present invention.

In typical operation, the coherent light interference signal is utilized to sample the non-coherent light interference signal at constant intervals of common variable optical path delay element 80's displacement. Applicants note that alternative configurations for non-coherent light interferometric measurement apparatus 21 are possible. For example, a constant velocity common variable optical path delay element may replace coherent light interferometer 55. Alternatively, non-coherent light interferometer 36 may not have a stationary reference branch. Further, the two branches may be arranged such that the path length of one branch increases while the path length of the second branch decreases by a corresponding amount, as illustrated in FIG. 7. As illustrated, a mirror 78' is mounted on common variable optical path delay element 80. In each alternative configuration, the function of the common variable path delay element is to provide a relative path delay between the two branches of the non-coherent light interferometer.

Figure 8:
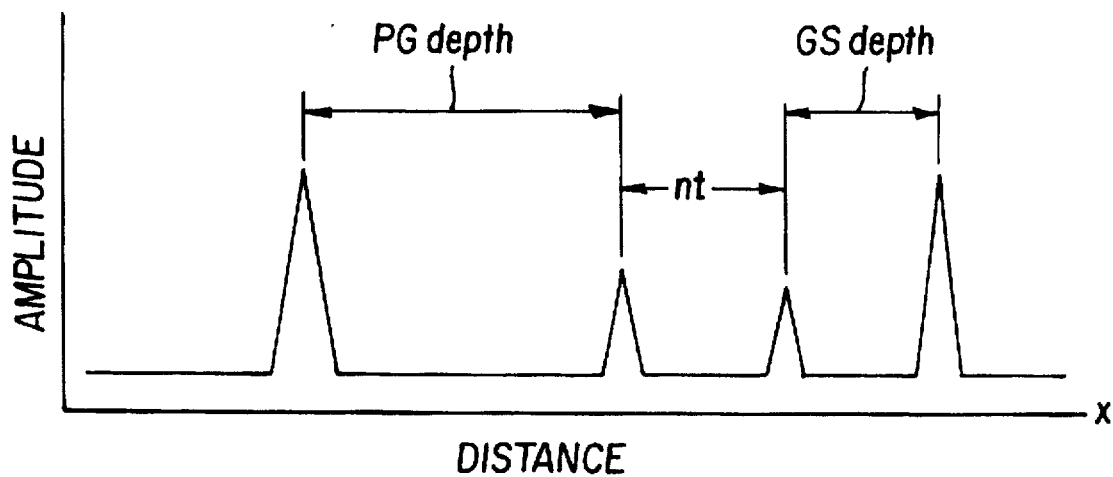
FIG. 8 shows reflections corresponding to the schematic view illustrated in FIG. 5.
Figure 9:
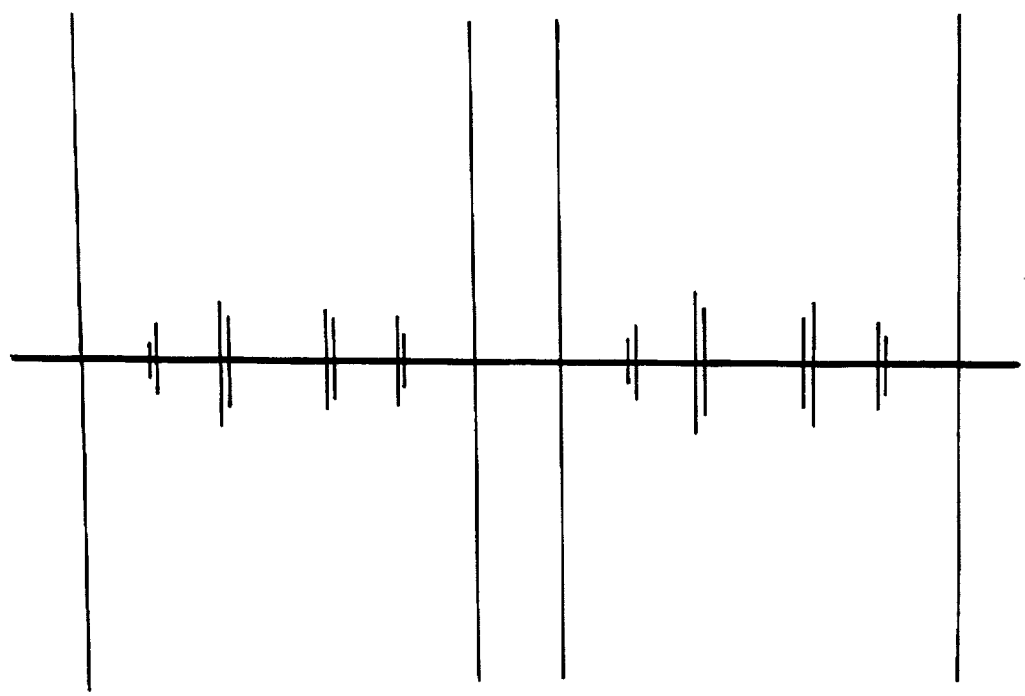
FIG. 9 shows an interferograin obtained with the present invention and corresponding to the reflections illustrated in FIG. 8.

The reflections shown in FIG. 8 further explain the interferogram illustrated in FIG. 9. FIG. 9 shows an optimized interferogram obtained during a measurement of a digital camera's imager plane location. During alignment of the optical probe, the interference signal is optimized when the peak amplitudes of the interferogram are at a maximum. Reflections occur at each optical interface in the focal region of optical probe 42, that is, the locations of pellicle 48, the front 52 and back 54 surface of plate 20, and at imager plane 18. The interferogram measures optical path, so the apparent depth between front surface 52 and back surface 54 is a value of nt.

Figure 10:
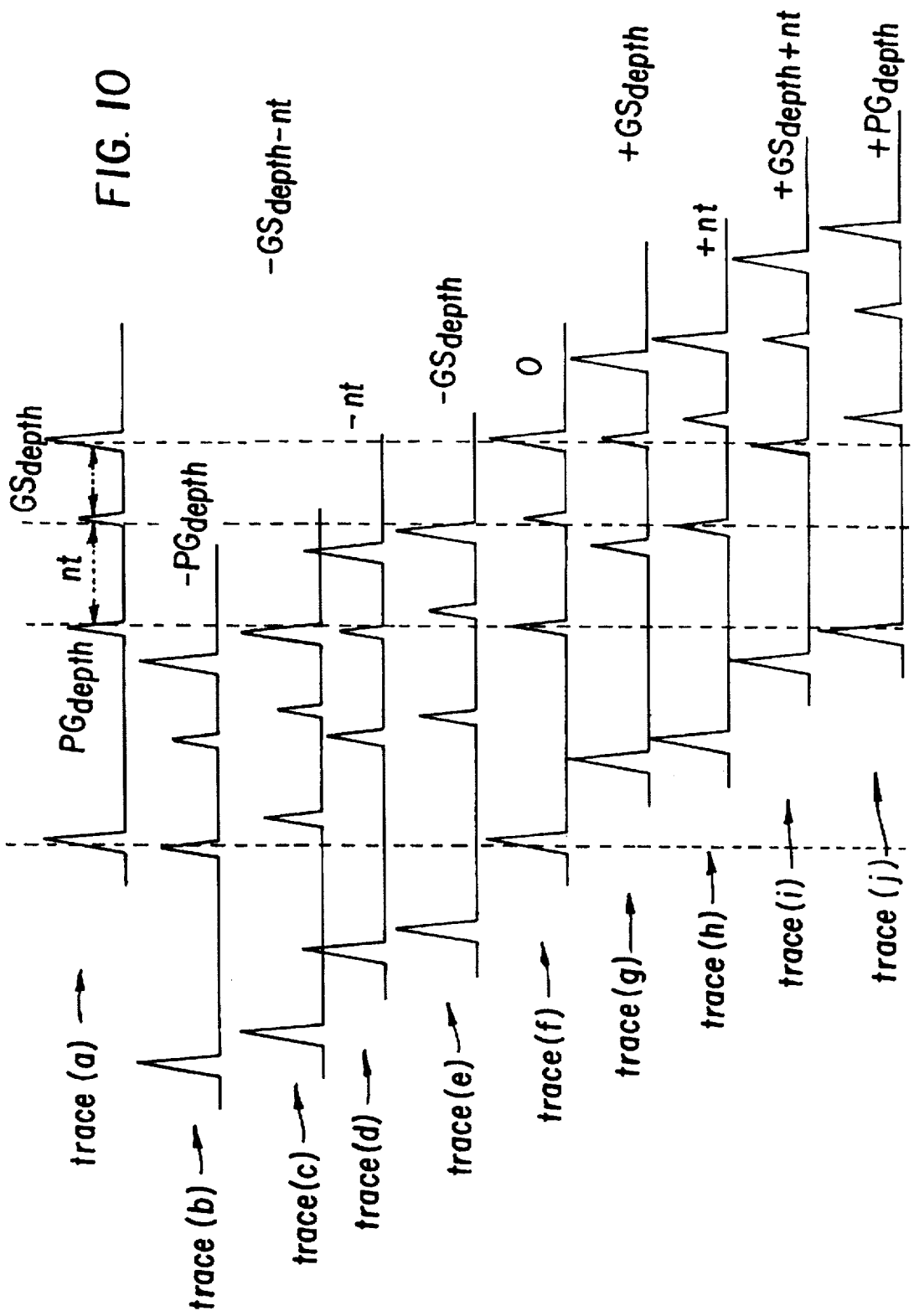
FIG. 10 shows a series of reflections observed as the optical path delay element is moved in accordance with the present invention.

FIG. 10 illustrates locations wherein constructive interference will occur during the measurement of the imager plane location. A series of reflections are observed as the variable optical path delay element is moved. Traces (a)–(j) show the optical signals input into the two branches of the non-coherent light interferometer. Traces (b)–(j) show distance delayed traces in the second branch or movable branch of the non-coherent light interferometer (that is, the second non-coherent light signal) as the optical path difference between the two branches of the non-coherent light interferometer monitonically increases from left to right. Trace (a) shows the first non-coherent light signal which can be considered to be the locations of the reflections observed in the stationary reference branch of non-coherent light interferometer 36. The vertical dashed lines in FIG. 10 emanating from positions of optical reflections in the stationary reference branch of non-coherent light interferometer 36 and represent reference markers where constructive interference will occur. Constructive interference will occur when the pulse trains of the two branches have peaks which are aligned vertically as illustrated. The nine locations of constructive interference shown in Traces (b)–(j) are sequential and define the zero path delay condition (Trace f) and the closest four surrounding locations of constructive interference. These locations are symmetrical around the zero path delay condition. Trace (b) of FIG. 10 illustrates the constructive interference wherein common variable optical path delay element 80 is at a position $-PG_{depth}$, and pellicle 48 interferes with the reflection from front surface 52 of plate 20. Similarly, Trace (c) illustrates the constructive interference wherein common variable optical path delay element 80 is at a position $-(GS_{depth}+nt)$ and front surface 52 of plate 20 interferes with the reflection from imager plane 18. Correspondingly, in Trace (d), constructive interference occurs when common variable optical path delay element 80 is at a position $-(nt)$ and front surface 52 of plate 20 interferes with back surface 54 of plate 20. Trace (e) shows the location of constructive interference at location $-GS_{depth}$ in which back surface 54 of plate 20 interferes with imager plane 18. Trace (f) shows the condition of zero path delay in which all reflections from the two branches of the non-coherent light interferometer constructively interfere with each other. This results in the largest intensity amplitude peak of the interferogram as illustrated in FIG. 9. Continuing to increase the optical path delay of the second branch of the non-coherent light interferometer results in Traces (g)—)j) occurring at $+GS_{depth}+nt$, $+GS_{depth}+nt$ and $PG_{depth}$ respectively. These locations are symmetric with respect to the zero path delay condition and are due to the same set of reflections but traveling down opposite branches of the non-coherent light interferometer than those in Traces (b)–(e). The autocorrelation spectrum is in general symmetrical about the origin.

In FIG. 9, the large peak at the left of the figure is the self correlation peak at the location where the path difference between the two branches in the non-coherent light interferometer equals zero. The first set of doublets (moving from left to right in FIG. 8) is due to interstice 22 (i.e., the gap between back surface 54 of plate 20 and imager plane 18) and the optical path of plate 20 (nt), respectively. The second set of doublets (continuing to the right in FIG. 9) occurs when the path difference between the two branches in the non-coherent light interferometer equals $GS_{depth}+nt$ and $PG_{depth}$, respectively. Intermediate the second and third set of doublets, motor 82 changes directions and the third set of doublets is due to $PG_{depth}$ and $GS_{depth}+nt$ respectively. The fourth set of doublets is due to nt and $GS_{depth}$, respectively. After the fourth set of doublets the interferometer crosses the zero path delay condition, resulting in the second large peak. After passing the zero path delay location, motor 82 is made to switch directions again and another zero path delay peak occurs (the third large peak from the left of FIG. 9). The pattern then repeats in the right-hand side of the figure. Accordingly, from this interferogram, the following information can be determined: the depth from the reference surface to front surface 52 of plate 20, the optical thickness of plate 20, and the depth from back surface 54 of plate 20 to imager plane 18.

In a preferred embodiment, measurements are performed at 20 Hz, the reference surface is selected as lens mount 14 (i.e., Reference Plane A), and, in a particular camera body 15, the focal depth $F_{depth}$ of the lens from the reference surface is determined to be 44 mm. The value of Delta, dependent on the thickness and index of refraction of plate 20, is determined to be between 242.5–277.1 microns for a glass plate having an index of refraction of 1.5174 and a thickness of about 30 mils +/–2 mils. Accordingly, the in-focus position $F_I$ of imager plane 18 relative to lens mount surface 14, accounting for optically transparent plate 20, varies between about 44.2425 to about 44.2771 mm. Pellicle 48 of a 1.5 μm polyester film is mounted to optical probe assembly 24 so as to be located 40 mm relative to lens mount 14 when optical probe assembly is locked to digital camera body 18. Optical probe assembly 24 is removably mounted to digital camera body 18. A one-second measurement time is standard, and data for twenty measurement cycles are typically calculated. Applicants have noted that the measurement reproducibility for fifty mount/dismount measurement cycles has been better than 2.5 microns for the measurement of the actual depth of the imager plane relative to the reference surface.

Figure 11:
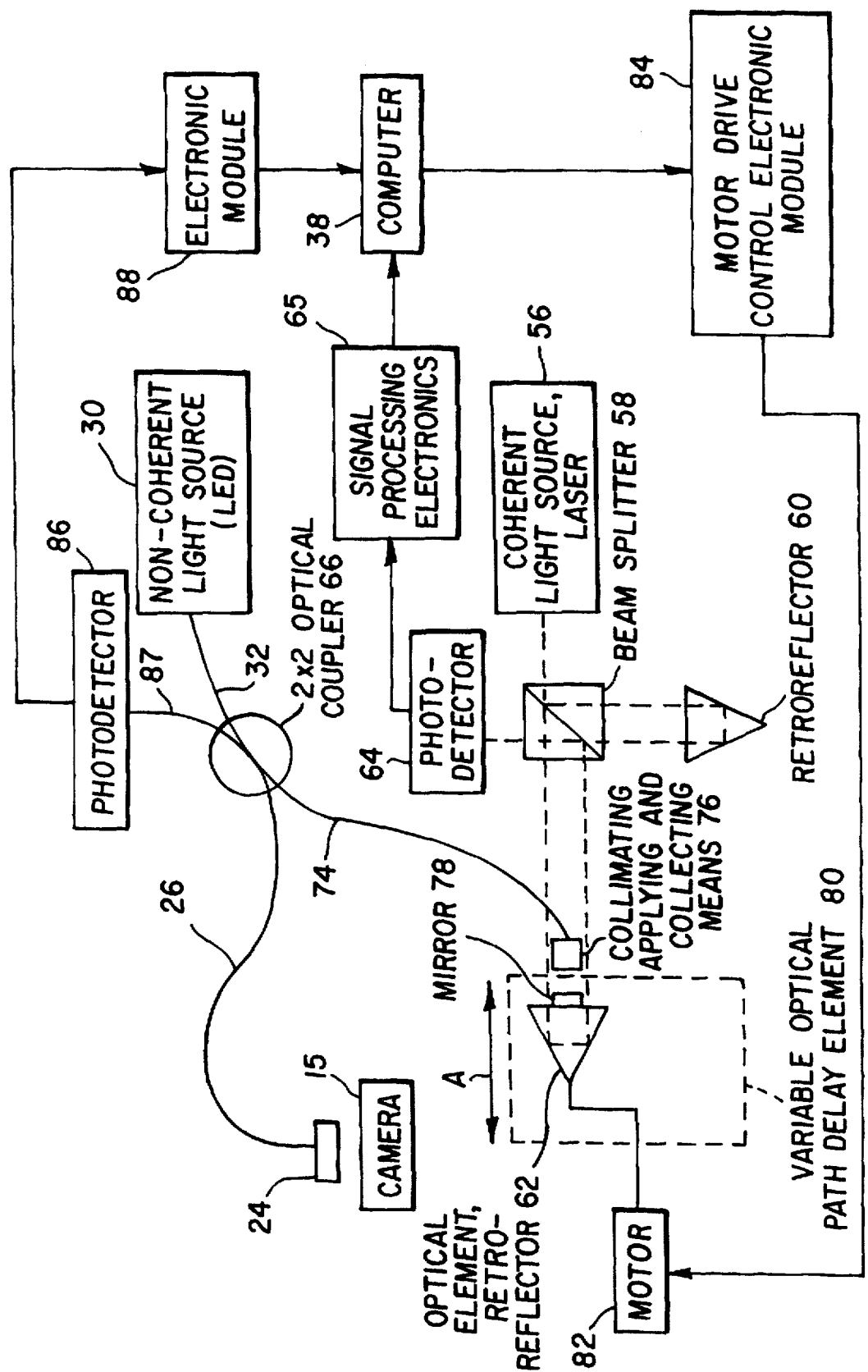
FIG. 11 shows a non-coherent light interferometer of FIG. 3 having a standard mode configuration in accordance with the present invention.

A corresponding non-coherent light interferometer 36 having a standard mode configuration is illustrated in FIG. 11. In this configuration, the optical probe assembly is inserted into one of the interfering branches of the non-coherent light interferometer, thus requiring the length of optical fiber 26 to be substantially equal to optical fiber 74.

The apparatus of the present invention may be employed in several methods: (i) to determine the position of an imager plane of an imager sensor within a camera body, (ii) verify that the position of an imager plane of an image sensor is within a desired tolerance, such as in-focus position $F_I$, (iii) determine the difference between the current position of the imager plane and the desired position of the imager plane, and, optionally, moving the imager plane to the desired position, and (iv) to position the imager plane at a desired position. Translation means, either manual or mechanical, may be employed to align the imager plane to the desired position. Such translation means are well known to those skilled in the art.

Figure 12:
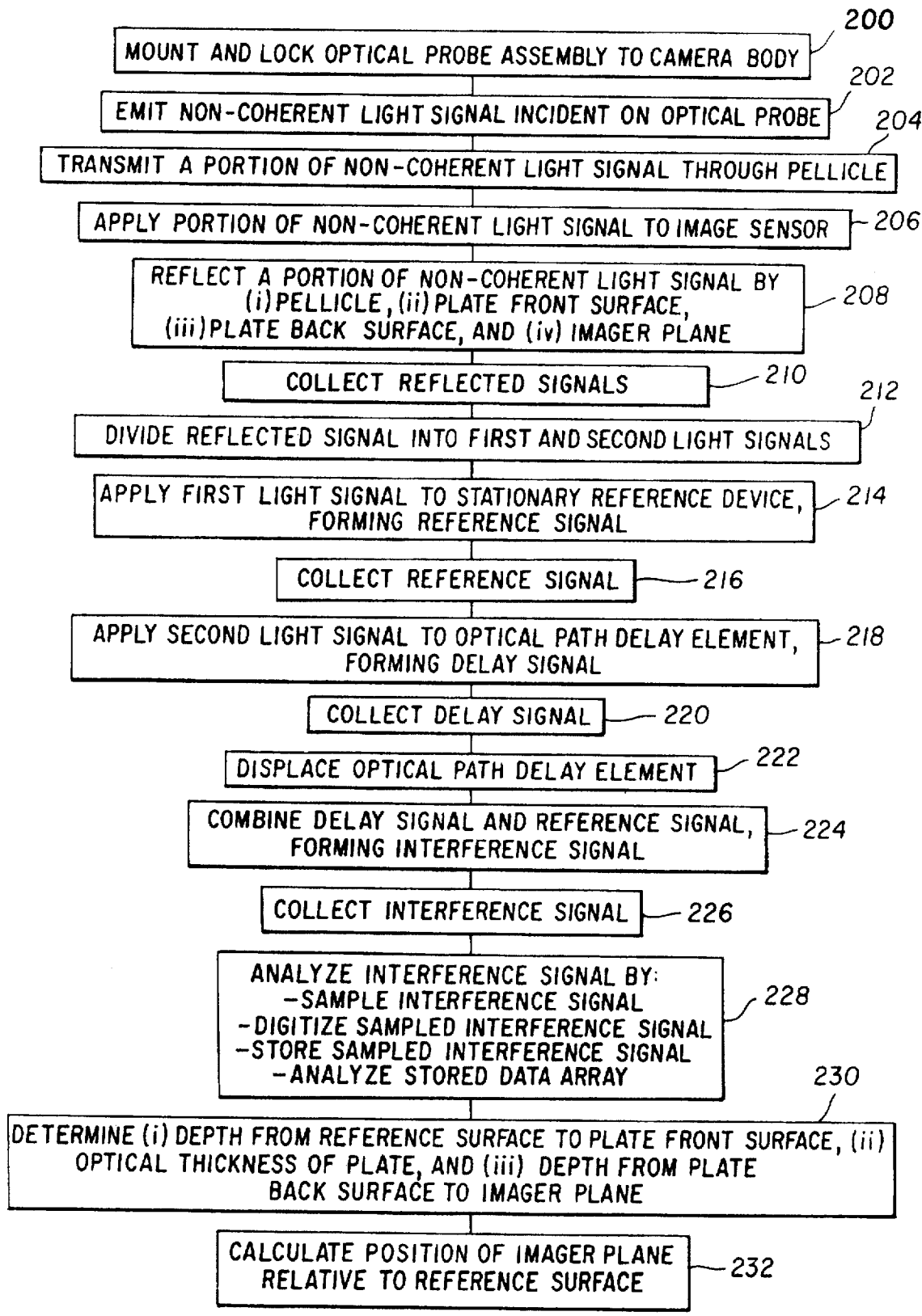
FIG. 12 shows a flow chart illustrating one method according to the present invention utilizing an autocorrelation mode configuration of a non-coherent light interferometer.
Figure 13:
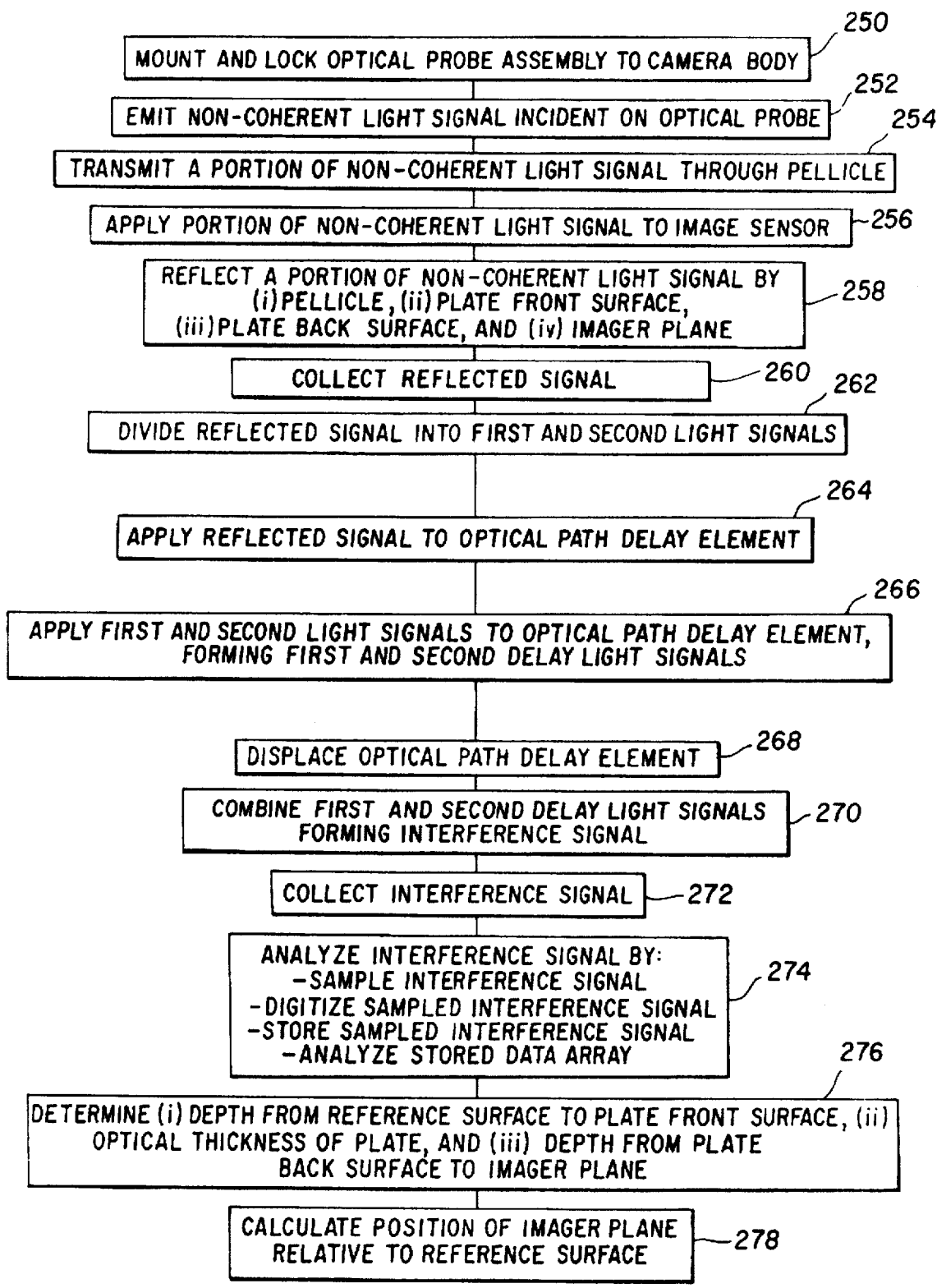
FIG. 13 shows a flow chart illustrating another method according to the present invention utilizing an autocorrelation mode configuration of a non-coherent light interferometer.
Figure 14:
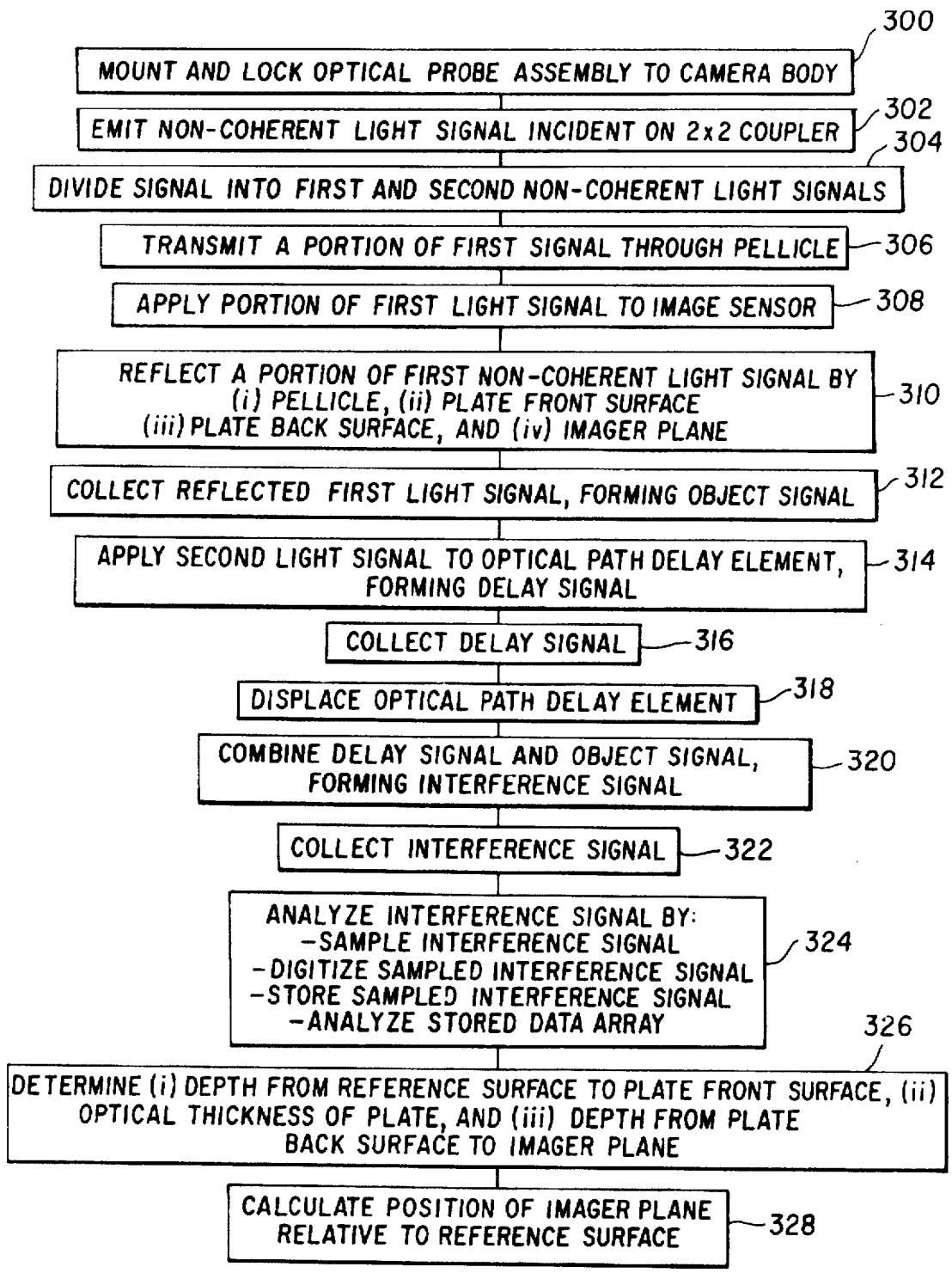
FIG. 14 shows a flow chart illustrating a further method according to the present invention utilizing a standard mode configuration of a non-coherent light interferometer.

As indicated above, non-coherent light interferometry may be employed in several ways to these methods: in a standard mode configuration, and in an autocorrelation mode. FIGS. 12 and 13 illustrate a method flow chart incorporating an autocorrelation mode configuration, while FIG. 14 illustrates a method flow chart incorporating a standard mode configuration of a non-coherent light interferometer. In each method illustrated in FIGS. 12 and 13, the apparatus of the present invention is employed to determine the position of the imager plane within a camera body (i.e., method (i) above). FIG. 12 illustrates a method incorporating an interferometer having a stationary and movable branch controllable by common variable optical path delay element 80. FIG. 13 illustrates a method incorporating an interferometer wherein common variable optical path delay element 80 causes the path length of the first branch to increase in length while the path length of the second branch to decrease by a corresponding amount.

As illustrated in FIG. 12 (an autocorrelation mode configuration), optical probe assembly 24 is mounted and locked to camera body 15 (step 200). Non-coherent light source 30 emits a continuous wave non-coherent light signal incident on optical probe assembly 24 (step 202). A portion of the non-coherent light signal is transmitted through pellicle 48 (step 204) to imager plane 18 (step 206). A portion of the non-coherent light signal is reflected by pellicle 48, front surface 52, back surface 54, and imager plane 18 (step 208). These reflected signals are collected (step 210) and divided into a first and second light signals (step 212). The first light signal is applied to stationary reference reflector 70 (step 214) wherein a portion of the first light signal is reflected by stationary reference reflector 70 to form a reference signal which is collected (step 216). The second light signal is applied to variable optical path delay element 80 to form a delay signal (step 218) which is collected (step 220). This application of the second light signal to the variable optical path delay element causes the optical path length of the second light signal to be varied when the variable optical path delay element is displaced with a predetermined distance or velocity profile (step 222). The delay signal and the reference signal are combined to form a non-coherent light interference signal (step 224) which is collected (step 226). The interference signal is analyzed (step 228) to determine the depth from the reference surface to front surface 52 of plate 20, the optical thickness of optically transparent plate 20, and the depth from back surface 54 of plate 20 to imager plane 18 (step 230). From this information, the position of imager plane 18 relative to the reference surface can be calculated (step 232).

To analyze the non-coherent light interference signal (step 228), the non-coherent light interference signal is sampled, digitized, and stored in a data array. The stored array is then analyzed to determine the depth from the reference surface to front surface 52, the optical thickness of optically transparent plate 20, and the depth from back surface 54 to imager plane 18. From these values, the position of the image sensor relative to the reference surface can be determined using Equation 1. Knowing the focal depth of the camera lens, the difference between the position of the image sensor and the in-focus position can be determined, whereby image sensor 16 can be moved by the difference value to locate the imager plane at the in-focus position.

As illustrated in FIG. 13 (an autocorrelation mode configuration), optical probe assembly 24 is mounted and locked to camera body 15 (step 250). Non-coherent light source 30 emits a continuous wave non-coherent light signal incident on optical probe assembly 24 (step 252). A portion of the non-coherent light signal is transmitted through pellicle 48 (step 254) to imager plane 18 (step 256). A portion of the non-coherent light signal is reflected by pellicle 48, front surface 52, back surface 54, and imager plane 18 (step 258). These reflected signals are collected (step 260) and divided into a first and second light signals (step 262). The first and second light signals are applied to variable optical path delay element 80 (step 264) to form first and second delay signals, respectively, (step 266). This application of the first and second light signals to the variable optical path delay element causes the optical path lengths to be varied when the variable optical path delay element is displaced with a predetermined distance or velocity profile (step 268). The first and second delay signals are combined to form a non-coherent light interference signal (step 270) which is collected (step 272). The interference signal is analyzed (step 274) to determine the depth from the reference surface to front surface 52 of plate 20, the optical thickness of optically transparent plate 20, and the depth from back surface 54 of plate 20 to imager plane 18 (step 276). From this information, the position of imager plane 18 relative to the reference surface can be calculated (step 278).

To analyze the non-coherent light interference signal (step 274), the non-coherent light interference signal is sampled, digitized, and stored in a data array. The stored array is then analyzed to determine the depth from the reference surface to front surface 52, the optical thickness of optically transparent plate 20, and the depth from back surface 54 to imager plane 18. From these values, the position of the image sensor relative to the reference surface can be determined using Equation 1. Knowing the focal depth of the camera lens, the difference between the position of the image sensor and the in-focus position can be determined, whereby image sensor 16 can be moved by the difference value to locate the imager plane at the in-focus position.

FIG. 14 illustrates a method incorporating the standard mode configuration. Optical probe assembly 24 is mounted and locked to camera body 15 (step 300). Non-coherent light source 30 emits a non-coherent light signal incident on 2×2 optical coupler 66 (step 302) which is divided into a first and second non-coherent light signal (step 304) traveling along optical fibers 26 and 74, respectively. The first non-coherent light signal is transmitted through pellicle 48 (step 306) to imager plane 18 of image sensor 16 (step 308). A portion of the first non-coherent light signal is reflected by pellicle 48, front surface 52, back surface 54, and imager plane 18 (step 310). These reflected signals are collected and form an object signal (step 312). The second non-coherent light signal is applied to variable optical path delay element 80, forming a delay signal (step 314), which is collected (step 316). Optical path delay element 80 is displaced (step 318), and the delay signal and object signal are combined to form a non-coherent interference signal (step 320). The corresponding interference signal is analyzed (step 322) to determine the values of the depth from the reference surface to front surface 52, the optical thickness of optically transparent plate 20, and the depth from back surface 54 to imager plane 18 (step 326). From this information, the position of imager plane 18 relative to the reference surface can be calculated (step 328).

To analyze the non-coherent light interference signal (step 324), the non-coherent light interference signal is sampled, digitized, and stored in a data array. The stored array is then analyzed to determine the depth from the reference surface to front surface 52, the optical thickness of optically transparent plate 20, and the depth from back surface 54 to imager plane 18. From these values, the position of the image sensor relative to the reference surface can be determined using Equation 1. Knowing the focal depth, the difference between the position of the image sensor and the focal depth can be determined, whereby image sensor 16 can be moved by the difference value to locate the imager plane at the in-focus position.

Additional steps may be required to accomplish the other methods described above. Specifically, to verify that the position of an imager plane of an image sensor is within a desired tolerance (i.e., method (ii) above), an additional calculation step of determining whether the position of the imager plane is within the desired tolerance is required. To determine the difference between the current position of the imager plane and the desired position of the imager plane (i.e., method (iii) above), an additional calculation step of Equation 6 is employed, to position the imager plane at a desired position (i.e., method (iv) above), the difference between the current position and the desired position of the imager plane is determined, and means are provided to move the imager plane by the difference.

Figure 15:
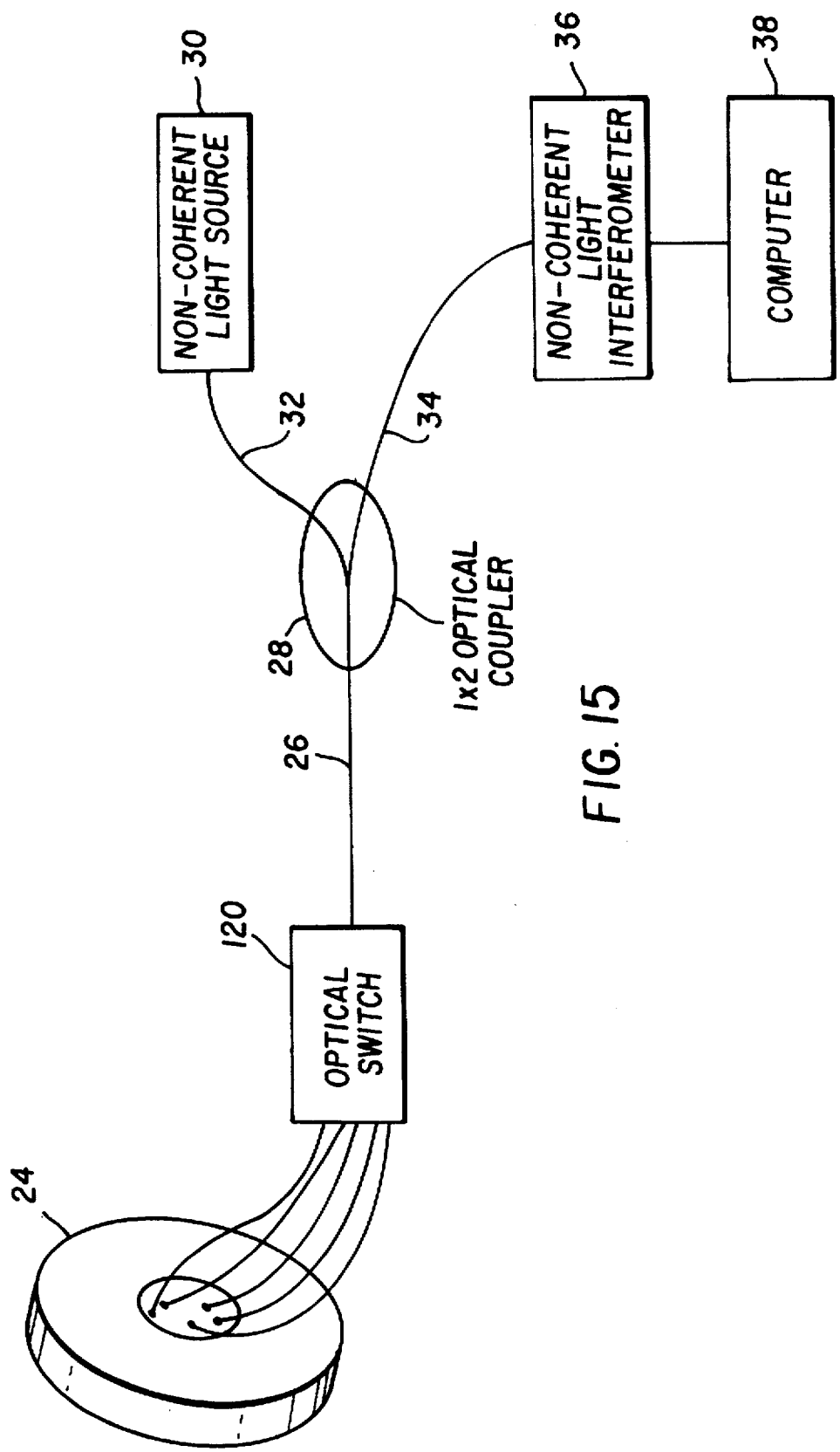
FIG. 15 shows a multi-point non-coherent light interferometric measurement apparatus according to the present invention.

While the above discussion refers to a single measurement location, a plurality of locations on the surface of image sensor 16 may be measured to provide (a) an indication of parallelism of imager plane 18 with respect to a reference surface and/or plate 20, and (b) a measure of the degree of flatness or bowing of imager plane 18, thereby providing spatial information about the focal position of the image sensor. For example, FIG. 15 illustrates the use of a 1×N optical switch 120, configured as a 1:5 optical switch, which allows five locations to be measured by means of a five measurement location fixture containing five individual optical probes mounted in a single optical probe assembly. The depth direction is defined as the z-axis. Each of the five measurement locations in the x,y plane (i.e., the locations of each of the optical probes) are measured sequentially using optical switch 120. Operation of the multiple-location measurement apparatus is similar to the single-location measurement apparatus described above with reference to FIGS. 12–14. However, the measurement process is repeated for each location. For example, in the instant case the measurement would be repeated five times with a switch being toggled to each of the individual five measurement locations. Additional information is provided about the flatness of the focal plane of the image sensor, the parallelism of imager plane 18 to plate 20 and the reference surface, the thickness of uniformity of plate 20, and the uniformity of interstice 22. A minimum of three measurement locations is required to obtain information about the parallelism of the imager plane relative to the reference surface.

An example of data obtained at five measurement locations for a digital imager is provided in Table I. Columns 1 and 2 of Table I identify the x and y locations of five measured positions utilizing the apparatus of FIG. 15. Columns 3 through 5 show the measured parameters from the interferograms shown in FIG. 9. (FIG. 9 shows the interferogram obtained at measurement location (0,0) for this particular camera.) Column 6 shows the values of $D_{actual}$ calculated using Equation 3; Column 7 shows the values of Delta obtained from Equation 2; and Column 8 shows the values for focus error $D_F$ calculated using Equation 6. The lower portion of Table I summarizes the measurement statistics. The range of the depth from the pellicle to the front surface of plate 20 along the z-axis is observed to be only 0.34 microns, implying a high degree of parallelism of the pellicle to the front surface of plate 20. The optical thickness (i.e., nt) of plate 20 varied by 2.78 microns which is equal to a thickness variation of 1.83 microns over the measured region. The interstice varied by 3.92 microns, and the digital imager plane focus error varied from 14.93–20.13 microns over the measured surface of the imager plane. Hence, the imager plane of the digital camera measured in Table I is not exactly parallel to the reference surface of the camera. Rather, some variation occurs along the x and y axis, with the majority being along the x axis. The flatness of the imager plane can also be determined from the data in Table I; the data in Table I indicates that the image sensor has a relatively flat imager plane.

TABLE I

Five position measurement data on a digital camera utilizing the apparatus and method of the present invention

| x | y | $GS_{depth}$ | plate nt | $PG_{depth}$ | $D_{actual}$ | Delta | $D_F$ |
|---|---|---|---|---|---|---|---|
| −9 | −6 | 1050.55 | 1223.52 | 2433.38 | 44290.26 | 274.94 | 15.32 |
| −9 | 6 | 1050.58 | 1223.24 | 2433.08 | 44289.80 | 274.88 | 14.93 |
| 0 | 0 | 1052.51 | 1224.61 | 2433.27 | 44292.82 | 275.18 | 17.64 |
| 9 | −6 | 1054.47 | 1225.48 | 2433.42 | 44295.51 | 275.38 | 20.13 |
| 9 | 6 | 1054.45 | 1226.02 | 2433.19 | 44295.61 | 275.50 | 20.11 |
| AVG | | 1052.51 | 1224.57 | 2433.27 | 44292.80 | 275.18 | 17.62 |
| sigma | | 1.95 | 1.20 | 0.14 | 2.77 | 0.27 | 2.50 |
| max | | 1054.47 | 1226.02 | 2433.42 | 44295.61 | 275.50 | 20.13 |
| min | | 1050.55 | 1223.24 | 2433.08 | 44289.80 | 274.88 | 14.93 |
| range | | 3.92 | 2.78 | 0.34 | 5.81 | 0.62 | 5.20 |

While additional measurement locations may be measured utilizing a 1×N optical switch, Applicants have noted that increasing the number density of measurement points constrains the size of the optical elements utilized for alignment. As such, an optional translation stage (not shown) movable in two dimensions (for example, an x,y coordinate system), may be mounted to optical probe assembly 24. Such a translation stage allows multiple measurements on the image sensor to be made using a single measurement apparatus, thereby providing an alternative to multiplexing as illustrated in FIG. 15.

The invention has been described in detail with particular reference to a presently preferred embodiment, but it will be understood that variations and modifications can be effected within the spirit and scope of the invention. For example, the invention could be utilized to measure the position of another optical component, such as a filter. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

- 10 conventional camera body
- 12 lens
- 13 film
- 14 lens mount
- 15 digital camera body
- 16 image sensor; CCD
- 18 imager plane of image sensor
- 20 optically transparent plate; glass plate
- 21 non-coherent light interferometric measurement apparatus
- 22 interstice
- 23 locking means; spring loaded locking pin
- 24 optical probe assembly
- 25 unlocking means; spring loaded release pin
- 26 single mode fiber
- 28 1×2 optical coupler
- 30 non-coherent light source
- 32 single mode fiber
- 34 optical fiber
- 36 non-coherent light interferometer
- 38 computing means; computer
- 40 probe mounting surface
- 42 optical probe; collimating lens, fiber collimator
- 43 probe housing
- 44 probe assembly mounting means
- 45 probe assembly gripping means
- 46 probe recess
- 48 pellicle
- 49 pellicle mount
- 50 O-ring
- 52 front surface of plate 20
- 54 back surface of plate 20
- 55 coherent light interferometer
- 56 coherent light source; laser
- 58 splitting means; beam splitter
- 60 stationary retroreflector
- 62 optical element; retroreflector
- 64 photodetector
- 65 signal processing electronics
- 66 2×2 optical coupler
- 68 single mode optical fiber
- 70 stationary reference reflector
- 72 collimating applying and collecting means
- 74 single mode optical fiber
- 76 collimating applying and collecting means
- 78 mirror
- 80 common variable optical path delay element
- 82 motor
- 84 motor drive control electronic module
- 86 photodetector
- 87 single mode optical fiber
- 88 electronic module
- 92 fiber collimator collar
- 94 adjustment collar
- 96 adjustment screw(s)
- 98 ball pivot
- 100 ball pivot receiving plate
- 102 opening
- 104 mounting plate
- 106 fiber collimator collar mounting means
- 108 ball pivot receiving plate mounting means
- 110 optical probe assembly means
- 112 recess
- 114 collimating lens orientation and locking means
- 116 access holes
- 120 optical switch

What is Claimed is:

1. An apparatus for determining a position of an image sensor in a digital camera relative to a reference surface on said digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) an optical probe, and (b) a pellicle securely mounted relative to said optical probe, said pellicle disposed intermediate said reference surface and said imager plane, said pellicle disposed at a first depth from said reference surface when said optical probe is in said locked orientation, said optically transparent plate disposed intermediate said imager plane and said pellicle, a non-coherent light interferometer and a non-coherent light source in communication with said optical probe by means of an optical coupler; and means for determining (i) a second depth from said reference surface to said optically transparent plate front surface, (ii) an optical thickness of said optically transparent plate, and (iii) a third depth from said optically transparent plate back surface to said imager plane.

2. The apparatus according to claim 1 wherein said optical probe assembly further comprises a ball pivot, and said optical probe is rotatably mounted within said ball pivot.

3. The apparatus according to claim 1 wherein said optical probe assembly includes an adjustment means for optimizing a non-coherent light interference signal from said non-coherent light interferometer.

4. The apparatus according to claim 1 wherein said optical probe assembly includes an adjustment means for orienting the axis of said optical probe normal to said reference surface.

5. The apparatus according to claim 1 wherein said optical probe is a collimating lens pigtailed to a single mode optical fiber, and said optical probe assembly further comprises mounting means, orientation and locking means, and gripping means.

6. An apparatus for positioning an image sensor in a digital camera relative to an in-focus position, said image sensor including (i) an imager plane and (ii) an optically transparent plate having a front surface and a back surface, said plate being spaced from said imager plane, comprising:

an optical probe adapted to be removably mountable to the digital camera and lockable in a predetermined orientation relative to the digital camera;

a pellicle rigidly mounted to said optical probe, said pellicle disposed intermediate said reference surface and said imager plane, said pellicle disposed at a first depth from said reference surface when said optical probe is in said locked orientation, said optically transparent plate disposed intermediate said imager plane and said pellicle;

a non-coherent light interferometer and a non-coherent light source in communication with said optical probe by means of an optical coupler;

means for determining (i) a second depth from said reference surface to said optically transparent plate front surface, (ii) an optical thickness of said optically transparent plate, and (iii) a third depth from said optically transparent plate back surface to said imager plane, (iv) a position of the imager plane relative to the in-focus position; and translation means for aligning said imager plane at the in-focus position.

7. An apparatus for determining a position of an image sensor mounted in a digital camera relative to a reference surface on said digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) a plurality of optical probes, and (b) a pellicle securely mounted relative to each of said plurality of optical probes, said pellicle disposed intermediate said reference surface and said imager plane, said pellicle disposed at a first depth from said reference surface when said optical probes are in said locked orientation, said optically transparent plate disposed intermediate said imager plane and said pellicle;

a non-coherent light interferometer and a non-coherent light source in communication with said optical probes by means of an optical coupler;

optical switching means; and means for determining, for each of said plurality of optical probes, (i) a second depth from said reference surface to said optically transparent plate front surface, (ii) an optical thickness of said optically transparent plate, and (iii) a third depth from said optically transparent plate back surface to said imager plane.

8. An apparatus for determining a position of an image sensor mounted in a digital camera relative to a reference surface on said digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) an optical probe, and (b) a pellicle securely mounted relative to said optical probe, said pellicle disposed intermediate said reference surface and said imager plane, said pellicle disposed at a first depth from said reference surface when said optical probe is in said locked orientation, said optically transparent plate disposed intermediate said imager plane and said pellicle, a non-coherent light interferometer and a non-coherent light source in communication with said optical probe by means of an optical coupler;

translation means for moving said optical probe along an axis normal to said reference surface to provide a plurality of measurement locations; and means for determining, at each of said plurality of measurement locations, (i) a second depth from said reference surface to said optically transparent plate front surface, (ii) an optical thickness of said optically transparent plate, and (iii) a third depth from said optically transparent plate back surface to said imager plane.

9. An apparatus for determining whether an image sensor mounted in a digital camera is parallel relative to a reference surface on said digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) a plurality of optical probes, and (b) a pellicle securely mounted relative to each of said plurality of optical probes, said pellicle disposed intermediate said reference surface and said imager plane, said pellicle disposed at a first depth from said reference surface when said optical probes are in said locked orientation, said optically transparent plate disposed intermediate said imager plane and said pellicle;

a non-coherent light interferometer and a non-coherent light source in communication with said optical probes by means of an optical coupler;

optical switching means; and means for determining, for each of said plurality of optical probes, (i) a second depth from said reference surface to said optically transparent plate front surface, (ii) an optical thickness of said optically transparent plate, and (iii) a third depth from said optically transparent plate back surface to said imager plane.

10. An apparatus for determining whether an image sensor mounted in a digital camera is parallel relative to a reference surface on said digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) an optical probe, and (b) a pellicle securely mounted to said optical probe, said pellicle disposed intermediate said reference surface and said imager plane, said pellicle disposed at a first depth from said reference surface when said optical probe is in said locked orientation, said optically transparent plate disposed intermediate said imager plane and said pellicle;

a non-coherent light interferometer and a non-coherent light source in communication with said optical probe by means of an optical coupler;

optical switching means; and means for determining (i) a second depth from said reference surface to said optically transparent plate front surface, (ii) an optical thickness of said optically transparent plate, and (iii) a third depth from said optically transparent plate back surface to said imager plane.

11. An apparatus for determining the degree of flatness of an image sensor mounted in a digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) a plurality of optical probes, and (b) a pellicle securely mounted relative to each of said plurality of optical probes, said pellicle disposed intermediate said reference surface and said imager plane, said pellicle disposed at a first depth from said reference surface when said plurality of optical probes are in said locked orientation, said optically transparent plate disposed intermediate said imager plane and said pellicle;

a non-coherent light interferometer and a non-coherent light source in communication with said optical probes by means of an optical coupler;

optical switching means; and means for determining, for each of said plurality of optical probes, (i) a second depth from said reference surface to said optically transparent plate front surface, (ii) an optical thickness of said optically transparent plate, and (iii) a third depth from said optically transparent plate back surface to said imager plane.

12. An apparatus for determining the degree of flatness of an image sensor mounted in a digital camera, said image sensor including (i) an imager plane and (ii) an optically transparent plate having a front surface and a back surface, said plate being spaced from said imager plane, comprising:

an optical probe assembly adapted to be removably mountable to the digital camera and lockable in a predetermined orientation relative to the digital camera, said optical probe assembly including (a) an optical probe, and (b) a pellicle securely mounted relative to said optical probe, said pellicle disposed intermediate said reference surface and said imager plane, said pellicle disposed at a first depth from said reference surface when said optical probe is in said locked orientation, said optically transparent plate disposed intermediate said imager plane and said pellicle;

a non-coherent light interferometer and a non-coherent light source in communication with said optical probe by means of an optical coupler;

optical switching means; and means for determining (i) a second depth from said reference surface to said optically transparent plate front surface, (ii) an optical thickness of said optically transparent plate, and (iii) a third depth from said optically transparent plate back surface to said imager plane.

\* \* \* \* \*